US012451074B2

(12) United States Patent
Kim et al.

(10) Patent No.: US 12,451,074 B2
(45) Date of Patent: Oct. 21, 2025

(54) DISPLAY DEVICE AND MOBILE ELECTRONIC DEVICE INCLUDING SAME

(71) Applicant: Samsung Display Co., LTD., Yongin-si (KR)

(72) Inventors: Kyung Ho Kim, Yongin-si (KR); Gi Chang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/926,167

(22) Filed: Oct. 24, 2024

(65) Prior Publication Data

US 2025/0246140 A1 Jul. 31, 2025

(30) Foreign Application Priority Data

Jan. 31, 2024 (KR) ........................ 10-2024-0014911

(51) Int. Cl.
*G09G 3/3233* (2016.01)
*G09G 3/00* (2006.01)

(52) U.S. Cl.
CPC ........... *G09G 3/3233* (2013.01); *G09G 3/001* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ................. G09G 3/3233; G09G 3/001; G09G 2300/0426; G09G 2300/0819; G09G 2300/0852; G09G 2300/0861; G09G 2310/08
See application file for complete search history.

(56) References Cited

U.S. PATENT DOCUMENTS

| | | | | |
|---|---|---|---|---|
| 9,432,616 | B1 | 8/2016 | Hurd et al. | |
| 2021/0375203 | A1 * | 12/2021 | Chen ...................... | G09G 3/204 |

OTHER PUBLICATIONS

Jung, et al. "A 1.03-inch 2560x2560 3514 PPI Low Power OLEDoS Backplane with In-pixel Up-scaling Technique," SID 2023 Digest, 32-4, pp. 465-468.

* cited by examiner

*Primary Examiner* — Antonio Xavier
(74) *Attorney, Agent, or Firm* — Womble Bond Dickinson (US) LLP

(57) ABSTRACT

A display device includes: a display panel including a plurality of pixel groups, wherein one pixel group from among the plurality of pixel groups includes a normal pixel and a plurality of interpolation pixels around the normal pixel, wherein the normal pixel includes a driving transistor, a normal light emitting element, and a normal light emitting transistor configured to supply a driving current provided through a first node connected to a drain electrode of the driving transistor in response to a normal light emitting signal to the normal light emitting element, and wherein each of the plurality of interpolation pixels includes an interpolation light emitting element and a plurality of interpolation light emitting transistors configured to supply a part of the driving current inputted from the first node of an adjacent normal pixel in response to an interpolation light emitting signal to the interpolation light emitting element.

18 Claims, 15 Drawing Sheets

DISPLAY DEVICE AND MOBILE ELECTRONIC DEVICE INCLUDING SAME

CROSS-REFERENCE TO RELATED APPLICATION

The present application claims priority to and the benefit of Korean Patent Application No. 10-2024-0014911, filed on Jan. 31, 2024, in the Korean Intellectual Property Office, the entire disclosure of which is incorporated by reference herein.

BACKGROUND

1. Field

The present disclosure relates to a display device and a mobile electronic device including the same.

2. Description of the Related Art

Wearable devices in which a focus is formed at a distance close to user's eyes have been developed in the form of glasses or a helmet. For example, the wearable device may be a head mounted display (HMD) device or AR glasses. The wearable device provides an augmented reality (hereinafter, referred to as "AR") screen or a virtual reality (hereinafter, referred to as "VR") screen to a user.

The wearable devices such as the HMD device or the AR glasses generally require a display specification of approximately 3500 pixels per inch (PPI) or higher so that a user may use it for a long time without dizziness. To this end, organic light emitting diode on silicon (OLEDoS) technology that is a high-resolution small organic light emitting display device is emerging. The organic light emitting diode on silicon (OLEDoS) is technology for disposing an organic light emitting diode (OLED) on a semiconductor wafer substrate on which a complementary metal oxide semiconductor (CMOS) is disposed.

SUMMARY

Aspects and features of embodiments of the present disclosure provide a display device capable of achieving up-scaling by disposing a plurality of interpolation pixels emitting light in response to interpolation light emitting signal around a normal pixel, and capable of providing a high-resolution screen, and a mobile electronic device including the same.

In one or more embodiments, a display device includes: a display panel including a plurality of pixel groups, wherein one pixel group from among the plurality of pixel groups includes a normal pixel and a plurality of interpolation pixels around the normal pixel, wherein the normal pixel includes a driving transistor, a normal light emitting element, and a normal light emitting transistor configured to supply a driving current provided through a first node connected to a drain electrode of the driving transistor in response to a normal light emitting signal to the normal light emitting element, and wherein each of the plurality of interpolation pixels includes an interpolation light emitting element and a plurality of interpolation light emitting transistors configured to supply a part of the driving current inputted from the first node of an adjacent normal pixel in response to an interpolation light emitting signal to the interpolation light emitting element.

In one or more embodiments, the normal pixel is at a center in the one pixel group; a first interpolation pixel from among the plurality of interpolation pixels is in a first plane direction from the normal pixel; a second interpolation pixel from among the plurality of interpolation pixels is in a second plane direction opposite to the first plane direction from the normal pixel; a third interpolation pixel from among the plurality of interpolation pixels is in a third plane direction perpendicular to the first plane direction from the normal pixel; a fourth interpolation pixel from among the plurality of interpolation pixels is in a fourth plane direction opposite to the third plane direction from the normal pixel; a fifth interpolation pixel from among the plurality of interpolation pixels is in a first diagonal direction between the first plane direction and the third plane direction from the normal pixel; a sixth interpolation pixel from among the plurality of interpolation pixels is in a second diagonal direction between the second plane direction and the third plane direction from the normal pixel; a seventh interpolation pixel from among the plurality of interpolation pixels is in a third diagonal direction opposite to the second diagonal direction from the normal pixel; and an eighth interpolation pixel from among the plurality of interpolation pixels is in a fourth diagonal direction opposite to the first diagonal direction from the normal pixel.

In one or more embodiments, wherein each of the first to fourth interpolation pixels includes one pair of interpolation light emitting transistors configured to receive a portion of a first driving current from a first normal pixel and configured to receive a portion of a second driving current from a second normal pixel.

In one or more embodiments, the first interpolation pixel includes one pair of interpolation light emitting transistors configured to receive a portion of a first driving current from a first normal pixel in the first plane direction from the first interpolation pixel and configured to receive a portion of a second driving current from a second normal pixel in the second plane direction from the first interpolation pixel, and wherein the second interpolation pixel includes one pair of interpolation light emitting transistors configured to receive a portion of a first driving current from a first normal pixel in the first plane direction from the second interpolation pixel and configured to receive a portion of a second driving current from a second normal pixel in the second plane direction from the second interpolation pixel.

In one or more embodiments, the third interpolation pixel includes one pair of interpolation light emitting transistors configured to receive a portion of a first driving current from a first normal pixel in the third plane direction from the third interpolation pixel and configured to receive a portion of a second driving current from a second normal pixel in the fourth plane direction from the third interpolation pixel, and wherein the fourth interpolation pixel includes one pair of interpolation light emitting transistors configured to receive a portion of a first driving current from a first normal pixel in the third plane direction from the fourth interpolation pixel and configured to receive a portion of a second driving current from a second normal pixel in the fourth plane direction from the fourth interpolation pixel.

In one or more embodiments, each of the fifth to eighth interpolation pixels includes two pairs of interpolation light emitting transistors configured to receive a portion of a first driving current from a first normal pixel, configured to receive a portion of a second driving current from a second normal pixel, configured to receive a portion of a third driving current from a third normal pixel, and configured to receive a portion of a fourth driving current from a fourth normal pixel.

In one or more embodiments, the fifth interpolation pixel includes two pairs of interpolation light emitting transistors configured to receive driving currents from the normal pixels in each of the first to fourth diagonal directions from the fifth interpolation pixel, wherein the sixth interpolation pixel includes two pairs of interpolation light emitting transistors configured to receive driving currents from the normal pixels in each of the first to fourth diagonal directions from the sixth interpolation pixel, wherein the seventh interpolation pixel includes two pairs of interpolation light emitting transistors configured to receive driving currents from the normal pixels in each of the first to fourth diagonal directions from the seventh interpolation pixel, and wherein the eighth interpolation pixel includes two pairs of interpolation light emitting transistors configured to receive driving currents from the normal pixels in each of the first to fourth diagonal directions from the eighth interpolation pixel.

In one or more embodiments, an interpolation light emitting transistor in the fifth interpolation pixel is turned on in response to a first emission control signal, an interpolation light emitting transistor in the third interpolation pixel is turned on in response to a second emission control signal, an interpolation light emitting transistor in the sixth interpolation pixel is turned on in response to a third emission control signal, an interpolation light emitting transistor in the first interpolation pixel is turned on in response to a fourth emission control signal, a normal light emitting transistor in the normal pixel is turned on in response to a fifth emission control signal, an interpolation light emitting transistor in the second interpolation pixel is turned on in response to a sixth emission control signal, an interpolation light emitting transistor in the seventh interpolation pixel is turned on in response to a seventh emission control signal, an interpolation light emitting transistor in the fourth interpolation pixel is turned on in response to an eighth emission control signal, and an interpolation light emitting transistor in the eighth interpolation pixel is turned on in response to a ninth emission control signal.

In one or more embodiments, the fifth emission control signal supplied to the normal pixel is the normal light emitting signal, and wherein the first to fourth emission control signals and the sixth to ninth emission control signals supplied to the first to eighth interpolation pixels are interpolation light emitting signals.

In one or more embodiments, the first to ninth emission control signals are sequentially outputted during one frame period.

In one or more embodiments, an activation period of each of the first to ninth emission control signals does not overlap with each other.

In one or more embodiments, in a display area of the display panel, the normal pixel and the first to eighth interpolation pixels are arranged in a matrix form, wherein the normal pixels are at specified intervals in odd-numbered pixel rows, and wherein the first interpolation pixel and the second interpolation pixel are alternately located between neighboring normal pixels in the odd-numbered pixel rows.

In one or more embodiments, the normal pixels are located at specified intervals in even-numbered pixel columns, and wherein the third interpolation pixel and the fourth interpolation pixel are alternately located between the neighboring normal pixels in the even-numbered pixel columns.

In one or more embodiments, in any pixel rows in which the third interpolation pixel is located, the fifth interpolation pixel and the sixth interpolation pixel are alternately located with the third interpolation pixel therebetween.

In one or more embodiments, in any pixel rows in which the fourth interpolation pixel is located, the seventh interpolation pixel and the eighth interpolation pixel are alternately located with the fourth interpolation pixel therebetween.

In one or more embodiments, a mobile electronic device includes: a display panel including a plurality of pixel groups, wherein one pixel group from among the plurality of pixel groups includes a normal pixel and a plurality of interpolation pixels around the normal pixel, wherein the normal pixel includes a driving transistor, a normal light emitting element, and a normal light emitting transistor configured to supply a driving current through a first node connected to a drain electrode of the driving transistor in response to a normal light emitting signal to the normal light emitting element, and wherein each of the plurality of interpolation pixels includes an interpolation light emitting element and a plurality of interpolation light emitting transistors configured to supply a part of the driving current inputted from the first node of an adjacent normal pixel in response to an interpolation light emitting signal to the interpolation light emitting element.

In one or more embodiments, the normal pixel is at a center in the one pixel group; a first interpolation pixel from among the plurality of interpolation pixels is in a first plane direction from the normal pixel; a second interpolation pixel from among the plurality of interpolation pixels is in a second plane direction opposite to the first plane direction from the normal pixel; a third interpolation pixel from among the plurality of interpolation pixels is in a third plane direction perpendicular to the first plane direction from the normal pixel; a fourth interpolation pixel from among the plurality of interpolation pixels is in a fourth plane direction opposite to the third plane direction from the normal pixel; a fifth interpolation pixel from among the plurality of interpolation pixels is in a first diagonal direction between the first plane direction and the third plane direction from the normal pixel; a sixth interpolation pixel from among the plurality of interpolation pixels is in a second diagonal direction between the second plane direction and the third plane direction from the normal pixel; a seventh interpolation pixel from among the plurality of interpolation pixels is in a third diagonal direction opposite to the second diagonal direction from the normal pixel; and an eighth interpolation pixel from among the plurality of interpolation pixels is in a fourth diagonal direction opposite to the first diagonal direction from the normal pixel.

In one or more embodiments, each of the first to fourth interpolation pixels includes one pair of interpolation light emitting transistors configured to receive a portion of a first driving current from a first normal pixel and configured to receive a portion of a second driving current from a second normal pixel.

In one or more embodiments, the first interpolation pixel includes one pair of interpolation light emitting transistors configured to receive a portion of a first driving current from a first normal pixel in the first plane direction from the first interpolation pixel and configured to receive a portion of a second driving current from a second normal pixel in the second plane direction from the first interpolation pixel, and wherein the second interpolation pixel includes one pair of interpolation light emitting transistors configured to receive a portion of a first driving current from a first normal pixel in the first plane direction from the second interpolation pixel and configured to receive a portion of a second driving current from a second normal pixel in the second plane direction from the second interpolation pixel.

In one or more embodiments, the third interpolation pixel includes one pair of interpolation light emitting transistors configured to receive a portion of a first driving current from a first normal pixel in the third plane direction from the third interpolation pixel and configured to receive a portion of a second driving current from a second normal pixel in the fourth plane direction from the third interpolation pixel, and wherein the fourth interpolation pixel includes one pair of interpolation light emitting transistors configured to receive a portion of a first driving current from a first normal pixel in the third plane direction from the fourth interpolation pixel and configured to receive a portion of a second driving current from a second normal pixel in the fourth plane direction from the fourth interpolation pixel.

In the display device and the mobile electronic device including the same according to one or more embodiments, up-scaling is achieved by disposing the plurality of interpolation pixels emitting light in response to interpolation light emitting signal around the normal pixel, and a high-resolution screen can be provided.

BRIEF DESCRIPTION OF THE DRAWINGS

The above and other aspects and features according to embodiments of the present disclosure will become more apparent by describing in detail embodiments thereof with reference to the attached drawings, in which.

DETAILED DESCRIPTION

Figure 1:
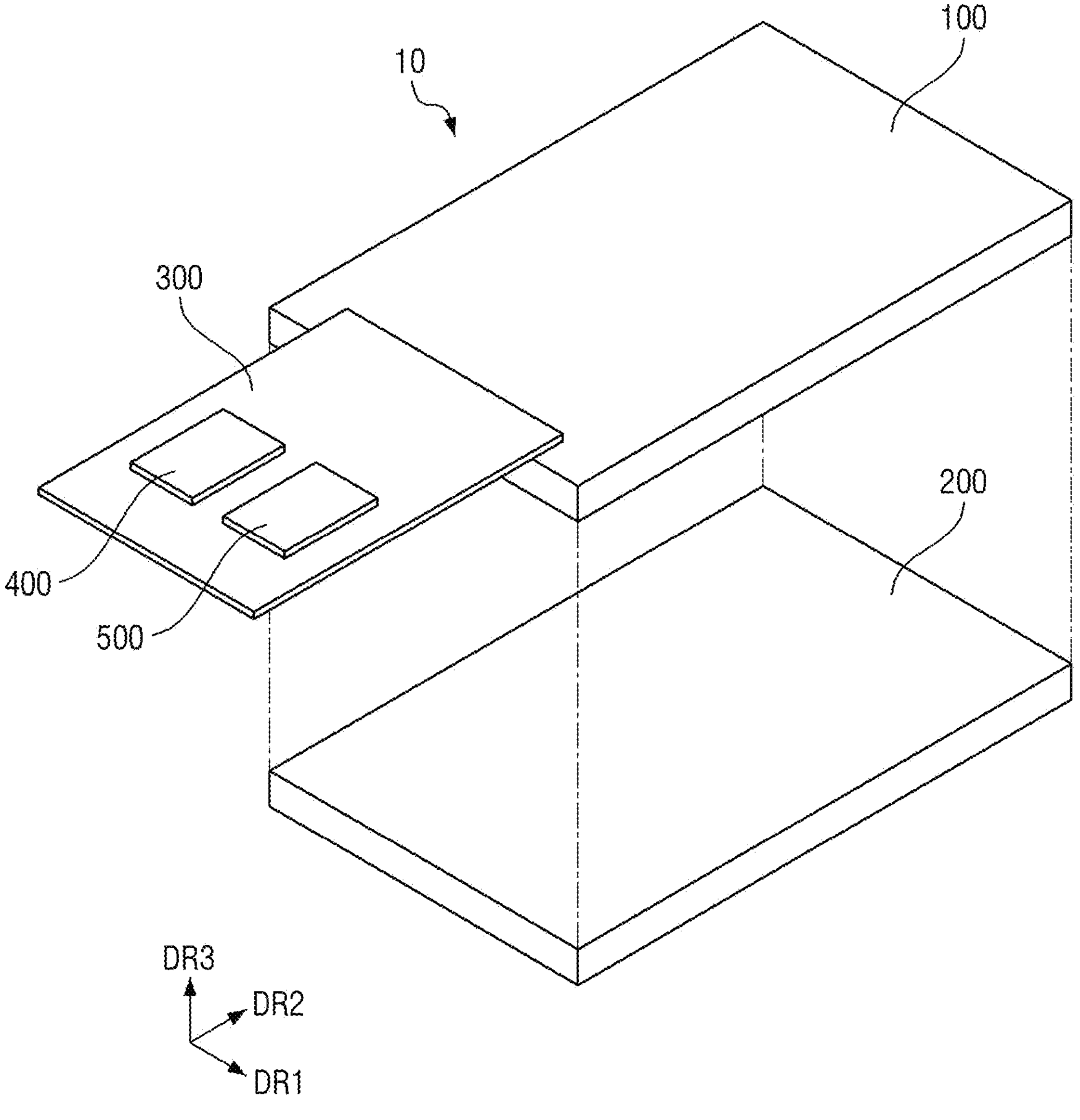
FIG. 1 is an exploded perspective view showing a display device according to one or more embodiments.

The present disclosure will now be described more fully hereinafter with reference to the accompanying drawings, in which embodiments of the present disclosure are shown. The present disclosure may, however, be embodied in different forms and should not be construed as being limited to the embodiments set forth herein. Rather, these embodiments are provided so that the present disclosure will be thorough and complete, and will fully convey the scope of the present disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Hereinafter, specific embodiments will be described with reference to the accompanying drawings.

Figure 2:
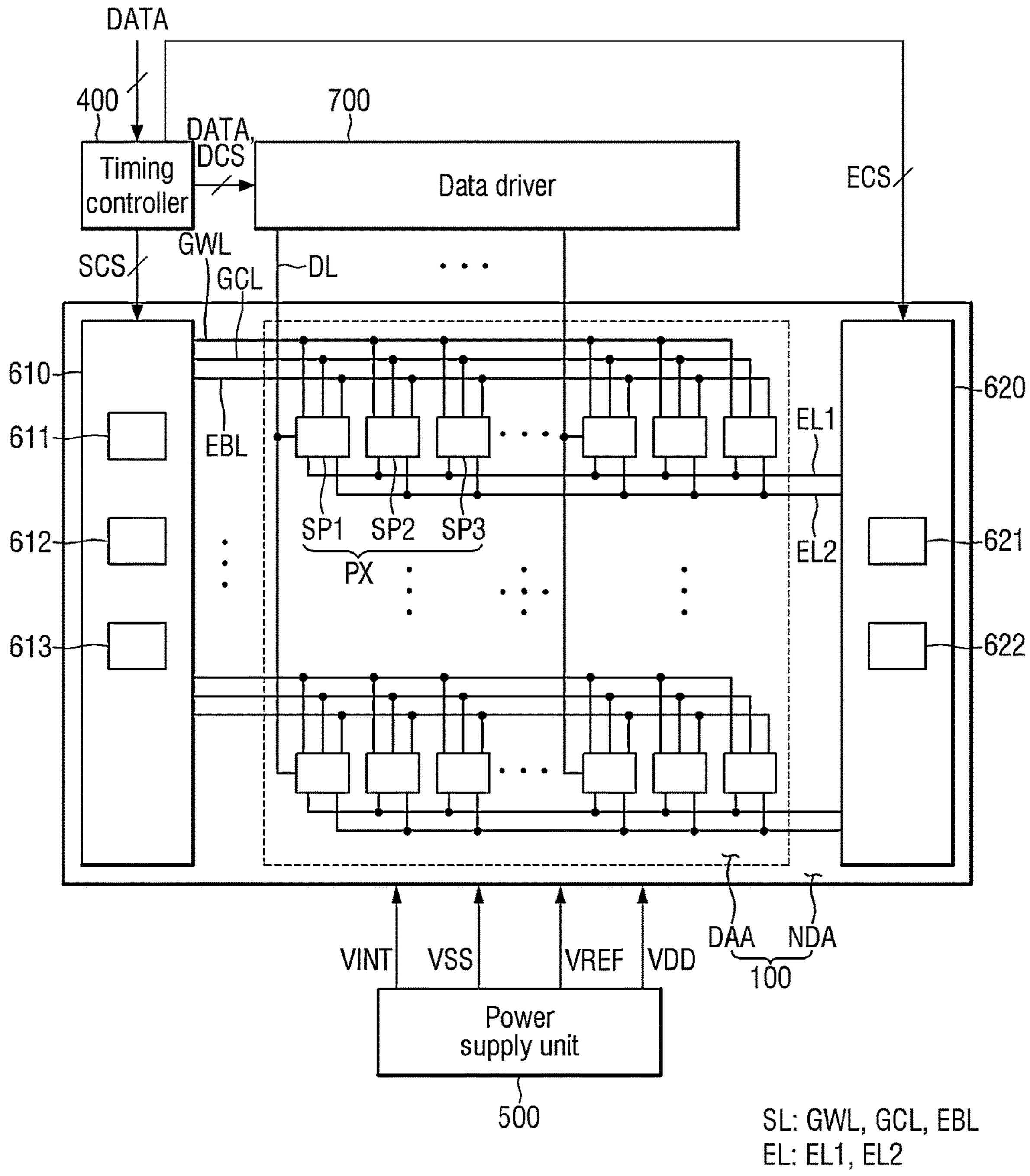
FIG. 2 is a block diagram illustrating a display device according to one or more embodiments.

FIG. 1 is an exploded perspective view showing a display device according to one or more embodiments. FIG. 2 is a block diagram illustrating a display device according to one or more embodiments.

Referring to FIGS. 1 and 2, a display device 10 according to one or more embodiments is a device for displaying a moving image and/or a still image. The display device 10 according to one or more embodiments may be applied to portable electronic devices such as a mobile phone, a smartphone, a tablet personal computer, a mobile communication terminal, an electronic organizer, an electronic book, a portable multimedia player (PMP), a navigation system, an ultra-mobile PC (UMPC) and/or the like. For example, the display device 10 according to one or more embodiments may be applied as a display unit of a television, a laptop, a monitor, a billboard, and/or an Internet-of-Things (IoT) terminal. Alternatively, the display device 10 according to one or more embodiments may be applied to a smart watch, a watch phone, a head mounted display (HMD) for implementing virtual reality and augmented reality, and/or the like.

The display device 10 according to one or more embodiments includes a display panel 100, a heat dissipation layer 200, a circuit board 300, a timing control circuit 400, and a power supply circuit 500.

The display panel 100 may have a planar shape similar to a quadrilateral shape. For example, the display panel 100 may have a planar shape similar to a quadrilateral shape, having a short side of a first direction DR1 and a long side of a second direction DR2 intersecting the first direction DR1. In the display panel 100, a corner where a short side in the first direction DR1 and a long side in the second direction DR2 meet may be right-angled or rounded with a suitable curvature (e.g., a predetermined curvature). The planar shape of the display panel 100 is not limited to a quadrilateral shape, and may be a shape similar to another polygonal shape, a circular shape, and/or an elliptical shape. The planar shape of the display device 10 may conform to the planar shape of the display panel 100, but the present disclosure is not limited thereto.

The display panel 100 includes a display area DAA displaying an image and a non-display area NDA not displaying an image as shown in FIG. 2.

The display area DAA includes a plurality of pixels PX, a plurality of scan lines SL, a plurality of emission control lines EL, and a plurality of data lines DL.

The plurality of pixels PX may be arranged in a matrix form in the first direction DR1 and the second direction DR2. For example, the plurality of pixels PX may be arranged along rows and columns of a matrix in the first direction DR1 and the second direction DR2. The plurality of scan lines SL and the plurality of emission control lines EL may extend in the first direction DR1, while being disposed along the second direction DR2. The plurality of data lines DL may extend in the second direction DR2, while being disposed along the first direction DR1.

The plurality of scan lines SL include a plurality of write scan lines GWL, a plurality of control scan lines GCL, and a plurality of bias scan lines EBL. The plurality of emission control lines EL include a plurality of first emission control lines EL1 and a plurality of second emission control lines EL2.

Figure 3:
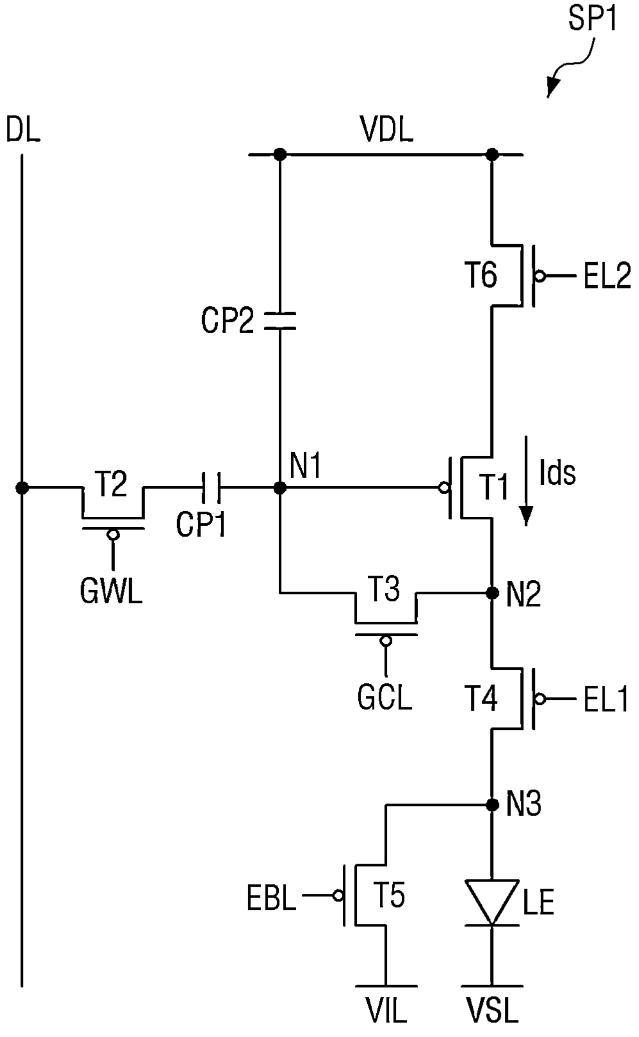
FIG. 3 is an equivalent circuit diagram of a first sub-pixel according to one or more embodiments.

The plurality of pixels PX include a plurality of sub-pixels SP1, SP2, and SP3. The plurality of sub-pixels SP1, SP2, and SP3 may include a plurality of pixel transistors as shown in FIG. 3, and the plurality of pixel transistors may be formed by a semiconductor process and disposed on a semiconductor substrate SSUB (see FIG. 7). For example, the plurality of pixel transistors of a data driver 700 may be formed of complementary metal oxide semiconductor (CMOS).

Each of the plurality of sub-pixels SP1, SP2, and SP3 may be connected to any one write scan line GWL from among the plurality of write scan lines GWL, any one control scan line GCL from among the plurality of control scan lines GCL, any one bias scan line EBL among the plurality of bias scan lines GBL, any one first emission control line EL1 from among the plurality of first emission control lines EL1, any one second emission control line EL2 from among the plurality of second emission control lines EL2, and any one data line DL from among the plurality of data lines DL. Each of the plurality of sub-pixels SP1, SP2, and SP3 may receive a data voltage of the data line DL in response to a write scan signal of the write scan line GWL, and emit light from the light emitting element according to the data voltage.

The non-display area NDA includes a scan driver 610, an emission driver 620, and the data driver 700. The non-display area NDA may be around the display area DAA along an edge or a periphery of the display area DAA.

The scan driver 610 includes a plurality of scan transistors, and the emission driver 620 includes a plurality of light emitting transistors. The plurality of scan transistors and the plurality of light emitting transistors may be formed on the semiconductor substrate SSUB (see FIG. 7) through a semiconductor process. For example, the plurality of scan transistors and the plurality of light emitting transistors may be formed of CMOS. Although it is illustrated in FIG. 2 that the scan driver 610 is disposed on the left side of the display area DAA and the emission driver 620 is disposed on the right side of the display area DAA, the present disclosure is not limited thereto. For example, the scan driver 610 and the emission driver 620 may be disposed on both the left side and the right side of the display area DAA.

The scan driver 610 may include a write scan signal output unit 611, a control scan signal output unit 612, and a bias scan signal output unit 613. Each of the write scan signal output unit 611, the control scan signal output unit 612, and the bias scan signal output unit 613 may receive a scan timing control signal SCS from the timing control circuit 400. The write scan signal output unit 611 may generate write scan signals according to the scan timing control signal SCS of the timing control circuit 400 and output them sequentially to the write scan lines GWL. The control scan signal output unit 612 may generate control scan signals in response to the scan timing control signal SCS and sequentially output them to the control scan lines GCL. The bias scan signal output unit 613 may generate bias scan signals according to the scan timing control signal SCS and output them sequentially to bias scan lines EBL.

The emission driver 620 includes a first emission control driver 621 and a second emission control driver 622. Each of the first emission control driver 621 and the second emission control driver 622 may receive the emission timing control signal ECS from the timing control circuit 400. The first emission control driver 621 may generate first emission control signals according to the emission timing control signal ECS and sequentially output them to the first emission control lines EL1. The second emission control driver 622 may generate second emission control signals according to the emission timing control signal ECS and sequentially output them to the second emission control lines EL2.

The data driver 700 may include a plurality of data transistors, and the plurality of data transistors may be formed on the semiconductor substrate SSUB (see FIG. 7) through a semiconductor process. For example, the plurality of data transistors may be formed of CMOS.

The data driver 700 may receive digital video data DATA and a data timing control signal DCS from the timing control circuit 400. The data driver 700 converts the digital video data DATA into analog data voltages according to the data timing control signal DCS and outputs the analog data voltages to the data lines DL. In this case, the sub-pixels SP1, SP2, and SP3 are selected by the write scan signal of the scan driver 610, and data voltages may be supplied to the selected sub-pixels SP1, SP2, and SP3.

The heat dissipation layer 200 may overlap the display panel 100 in a third direction DR3, which is the thickness direction of the display panel 100. The heat dissipation layer 200 may be disposed on one surface of the display panel 100, for example, on the rear surface thereof. The heat dissipation layer 200 serves to dissipate heat generated from the display panel 100. The heat dissipation layer 200 may include a metal layer such as graphite, silver (Ag), copper (Cu), and/or aluminum (Al) having high thermal conductivity.

The circuit board 300 may be electrically connected to a plurality of first pads PD1 (see FIG. 4) of a first pad portion PDA1 (see FIG. 4) of the display panel 100 by using a conductive adhesive member such as an anisotropic conductive film. The circuit board 300 may be a flexible printed circuit board (FPCB) with a flexible material, or a flexible film. Although the circuit board 300 is illustrated in FIG. 1 as being unfolded, the circuit board 300 may be bent. In this case, one end of the circuit board 300 may be disposed on the rear surface of the display panel 100 and/or the rear surface of the heat dissipation layer 200. One end of the circuit board 300 may be an opposite end of the other end of the circuit board 300 connected to the plurality of first pads PD1 (see FIG. 4) of the first pad portion PDA1 (see FIG. 4) of the display panel 100 by using a conductive adhesive member.

The timing control circuit 400 may receive digital video data DATA and timing signals inputted from the outside. The timing control circuit 400 may generate the scan timing control signal SCS, the emission timing control signal ECS, and the data timing control signal DCS for controlling the display panel 100 in response to the timing signals. The timing control circuit 400 may output the scan timing control signal SCS to the scan driver 610, and output the emission timing control signal ECS to the emission driver 620. The timing control circuit 400 may output the digital video data DATA and the data timing control signal DCS to the data driver 700.

The power supply circuit 500 may generate a plurality of panel driving voltages according to a power voltage from the outside. For example, the power supply circuit 500 may generate a first driving voltage VSS, a second driving voltage VDD, a third driving voltage VINT, and a reference voltage VREF, and supply them to the display panel 100. The first driving voltage VSS, the second driving voltage VDD, and the third driving voltage VINT will be described later in conjunction with FIG. 3.

Each of the timing control circuit 400 and the power supply circuit 500 may be formed as an integrated circuit (IC) and attached to one surface of the circuit board 300. In this case, the scan timing control signal SCS, the emission timing control signal ECS, the digital video data DATA, and the data timing control signal DCS of the timing control circuit 400 may be supplied to the display panel 100 through the circuit board 300. Further, the first driving voltage VSS, the second driving voltage VDD, and the third driving voltage VINT of the power supply circuit 500 may be supplied to the display panel 100 through the circuit board 300.

Alternatively, each of the timing control circuit 400 and the power supply circuit 500 may be disposed in the non-display area NDA of the display panel 100, similarly to the scan driver 610, the emission driver 620, and the data driver 700. In this case, the timing control circuit 400 may include a plurality of timing transistors, and each power supply circuit 500 may include a plurality of power transistors. The plurality of timing transistors and the plurality of power transistors may be formed on the semiconductor substrate SSUB (see FIG. 7) through a semiconductor process. For example, the plurality of timing transistors and the plurality of power transistors may be formed of CMOS. Each of the timing control circuit 400 and the power supply circuit 500 may be disposed between the data driver 700 and the first pad portion PDA1 (see FIG. 4).

FIG. 3 is an equivalent circuit diagram of a first sub-pixel according to one or more embodiments.

Referring to FIG. 3, the first sub-pixel SP1 may be connected to the write scan line GWL, the control scan line GCL, the bias scan line EBL, the first emission control line EL1, the second emission control line EL2, and the data line DL. Further, the first sub-pixel SP1 may be connected to a first driving voltage line VSL to which the first driving voltage VSS corresponding to a low potential voltage is applied, a second driving voltage line VDL to which the second driving voltage VDD corresponding to a high potential voltage is applied, and a third driving voltage line VIL to which the third driving voltage VINT corresponding to an initialization voltage is applied. That is, the first driving voltage line VSL may be a low potential voltage line, the second driving voltage line VDL may be a high potential voltage line, and the third driving voltage line VIL may be an initialization voltage line. In this case, the first driving voltage VSS may be lower than the third driving voltage VINT. The second driving voltage VDD may be higher than the third driving voltage VINT.

The first sub-pixel SP1 includes a plurality of transistors T1 to T6, a light emitting element LE, a first capacitor CP1, and a second capacitor CP2.

The light emitting element LE emits light in response to a driving current Ids flowing through the channel of the first transistor T1. The emission amount of the light emitting element LE may be proportional to the driving current Ids. The light emitting element LE may be disposed between the fourth transistor T4 and the first driving voltage line VSL. The first electrode of the light emitting element LE may be connected to the drain electrode of the fourth transistor T4, and the second electrode thereof may be connected to the first driving voltage line VSL. The first electrode of the light emitting element LE may be an anode electrode, and the second electrode of the light emitting element LE may be a cathode electrode. The light emitting element LE may be an organic light emitting diode (OLED) including a first electrode, a second electrode, and an organic light emitting layer disposed between the first electrode and the second electrode, but the present disclosure is not limited thereto. For example, the light emitting element LE may be an inorganic light emitting element including a first electrode, a second electrode, and an inorganic semiconductor disposed between the first electrode and the second electrode, in which case the light emitting element LE may be a micro light emitting diode.

The first transistor T1 may be a driving transistor that controls a source-drain current Ids (hereinafter referred to as a “driving current”) flowing between the source electrode and the drain electrode thereof according to a voltage applied to the gate electrode thereof. The first transistor T1 includes a gate electrode connected to a first node N1, a source electrode connected to the drain electrode of the sixth transistor T6, and a drain electrode connected to a second node N2.

The second transistor T2 may be disposed between one electrode of the first capacitor CP1 and the data line DL. The second transistor T2 is turned on by the write scan signal of the write scan line GWL to connect the one electrode of the first capacitor CP1 to the data line DL. Accordingly, the data voltage of the data line DL may be applied to the one electrode of the first capacitor CP1. The second transistor T2 includes a gate electrode connected to the write scan line GWL, a source electrode connected to the data line DL, and a drain electrode connected to the one electrode of the first capacitor CP1.

The third transistor T3 may be disposed between the first node N1 and the second node N2. The third transistor T3 is turned on by the write control signal of the write control line GCL to connect the first node N1 to the second node N2. For this reason, because the gate electrode and the source electrode of the first transistor T1 are connected, the first transistor T1 may operate like a diode (e.g., the first transistor T1 may be diode-connected). The third transistor T3 includes a gate electrode connected to the write control line GCL, a source electrode connected to the second node N2, and a drain electrode connected to the first node N1.

The fourth transistor T4 may be connected between the second node N2 and a third node N3. The fourth transistor T4 is turned on by the first emission control signal of the first emission control line EL1 to connect the second node N2 to the third node N3. Accordingly, the driving current of the first transistor T1 may be supplied to the light emitting element LE. The fourth transistor T4 includes a gate electrode connected to the first emission control line EL1, a source electrode connected to the second node N2, and a drain electrode connected to the third node N3.

The fifth transistor T5 may be disposed between the third node N3 and the third driving voltage line VIL. The fifth transistor T5 is turned on by the bias scan signal of the bias scan line EBL to connect the third node N3 to the third driving voltage line VIL. Accordingly, the third driving voltage VINT of the third driving voltage line VIL may be applied to the first electrode of the light emitting element LE. The fifth transistor T5 includes a gate electrode connected to the bias scan line EBL, a source electrode connected to the third node N3, and a drain electrode connected to the third driving voltage line VIL.

The sixth transistor T6 may be disposed between the source electrode of the first transistor T1 and the second driving voltage line VDL. The sixth transistor T6 is turned on by the second emission control signal of the second emission control line EL2 to connect the source electrode of the first transistor T1 to the second driving voltage line VDL. Accordingly, the second driving voltage VDD of the second driving voltage line VDL may be applied to the source electrode of the first transistor T1. The sixth transistor T6 includes a gate electrode connected to the second emission control line EL2, a source electrode connected to the second driving voltage line VDL, and a drain electrode connected to the source electrode of the first transistor T1.

The first capacitor CP1 is formed between the first node N1 and the drain electrode of the second transistor T2. The first capacitor CP1 includes one electrode connected to the drain electrode of the second transistor T2 and the other electrode connected to the first node N1.

The second capacitor CP2 is formed between the gate electrode of the first transistor T1 (or the first node N1) and the second driving voltage line VDL. The second capacitor CP2 includes one electrode connected to the gate electrode of the first transistor T1 and the other electrode connected to the second driving voltage line VDL.

The first node N1 is a junction between the gate electrode of the first transistor T1, the drain electrode of the third transistor T3, the other electrode of the first capacitor CP1, and the one electrode of the second capacitor CP2. The second node N2 is a junction between the drain electrode of the first transistor T1, the source electrode of the third transistor T3, and the source electrode of the fourth transistor T4. The third node N3 is a junction between the drain electrode of the fourth transistor T4, the source electrode of the fifth transistor T5, and the first electrode of the light emitting element LE.

Each of the first to sixth transistors T1 to T6 may be a metal-oxide-semiconductor field effect transistor (MOSFET). For example, each of the first to sixth transistors T1 to T6 may be a P-type MOSFET, but the present disclosure is not limited thereto. Each of the first to sixth transistors T1 to T6 may be an N-type MOSFET. Alternatively, some of the first to sixth transistors T1 to T6 may be P-type MOSFETs, and each of the remaining transistors may be an N-type MOSFET.

Although it is illustrated in FIG. 3 that the first sub-pixel SP1 includes six transistors T1 to T6 and two capacitors CP1 and CP2, it should be noted that the equivalent circuit diagram of the first sub-pixel SP1 is not limited to that shown in FIG. 3. For example, the number of transistors and the number of capacitors of the first sub-pixel SP1 are not limited to those shown in FIG. 3.

Further, the equivalent circuit diagram of the second sub-pixel SP2 and the equivalent circuit diagram of the third sub-pixel SP3 may be substantially the same as the equivalent circuit diagram of the first sub-pixel SP1 described in conjunction with FIG. 3. Therefore, the description of the equivalent circuit diagram of the second sub-pixel SP2 and the equivalent circuit diagram of the third sub-pixel SP3 is omitted in the present specification.

Figure 4:
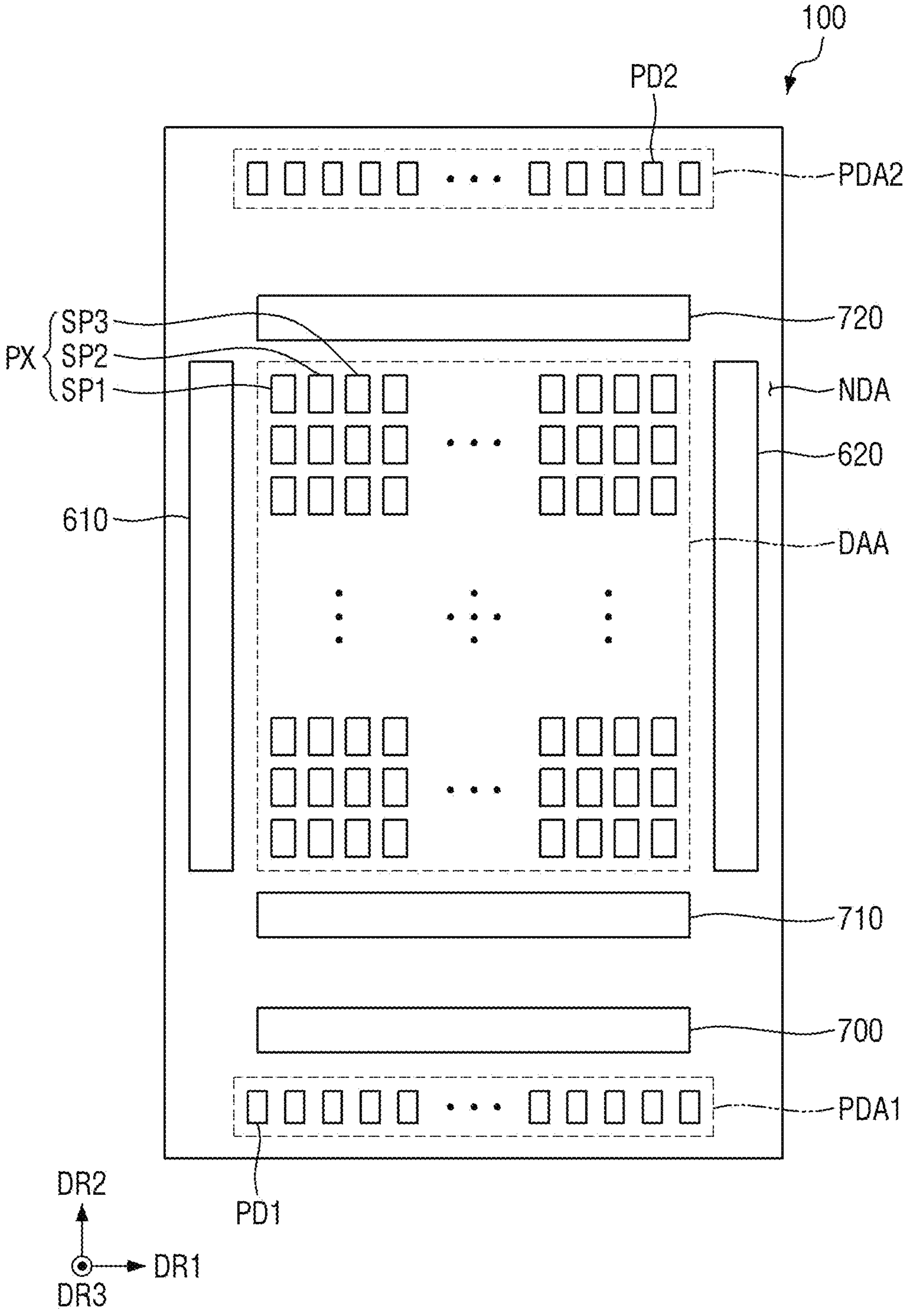
FIG. 4 is a layout diagram illustrating an example of a display panel according to one or more embodiments.

FIG. 4 is a layout diagram illustrating an example of a display panel according to one or more embodiments.

Referring to FIG. 4, the display area DAA of the display panel 100 according to one or more embodiments includes the plurality of pixels PX arranged in a matrix form. The non-display area NDA of the display panel 100 according to one or more embodiments includes the scan driver 610, the emission driver 620, the data driver 700, a first distribution circuit 710, a second distribution circuit 720, the first pad portion PDA1, and a second pad portion PDA2.

The scan driver 610 may be disposed on the first side of the display area DAA, and the emission driver 620 may be disposed on the second side of the display area DAA. For example, the scan driver 610 may be disposed on one side of the display area DAA in the first direction DR1, and the emission driver 620 may be disposed on the other side of the display area DAA in the first direction DR1. That is, the scan driver 610 may be disposed on the left side of the display area DAA, and the emission driver 620 may be disposed on the right side of the display area DAA. However, the present disclosure is not limited thereto, and the scan driver 610 and the emission driver 620 may be disposed on both the first side and the second side of the display area DAA.

The first pad portion PDA1 may include the plurality of first pads PD1 connected to pads or bumps of the circuit board 300 through a conductive adhesive member. The first pad portion PDA1 may be disposed on the third side of the display area DAA. For example, the first pad portion PDA1 may be disposed on one side of the display area DAA in the second direction DR2.

The first pad portion PDA1 may be disposed outside the data driver 700 in the second direction DR2. That is, the first pad portion PDA1 may be disposed closer to the edge of the display panel 100 than the data driver 700.

The second pad portion PDA2 may include a plurality of second pads PD2 corresponding to inspection pads that test whether the display panel 100 operates normally. The plurality of second pads PD2 may be connected to a jig or a probe pin during an inspection process, or may be connected to a circuit board for inspection. The circuit board for inspection may be a printed circuit board (PCB) made of a rigid material or a flexible printed circuit board (FPCB) made of a flexible material.

The first distribution circuit 710 distributes data voltages applied through the first pad portion PDA1 to the plurality of data lines DL. For example, the first distribution circuit 710 may distribute the data voltages applied through one first pad PD1 of the first pad portion PDA1 to the P (P is a positive integer of 2 or more) data lines DL, and as a result, the number of the plurality of first pads PD1 may be reduced. The first distribution circuit 710 may be disposed on the third side of the display area DAA of the display panel 100. For example, the first distribution circuit 710 may be disposed on one side of the display area DAA in the second direction DR2. That is, the first distribution circuit 710 may be disposed on the lower side of the display area DAA.

The second distribution circuit 720 distributes signals applied through the second pad portion PDA2 to the scan driver 610, the emission driver 620, and the data lines DL. The second pad portion PDA2 and the second distribution circuit 720 may be configured to inspect the operation of each of the pixels PX in the display area DAA. The second distribution circuit 720 may be disposed on the fourth side of the display area DAA of the display panel 100. For example, the second distribution circuit 720 may be disposed on the other side of the display area DAA in the second direction DR2. That is, the second distribution circuit 720 may be disposed on the upper side of the display area DAA.

Figure 5:
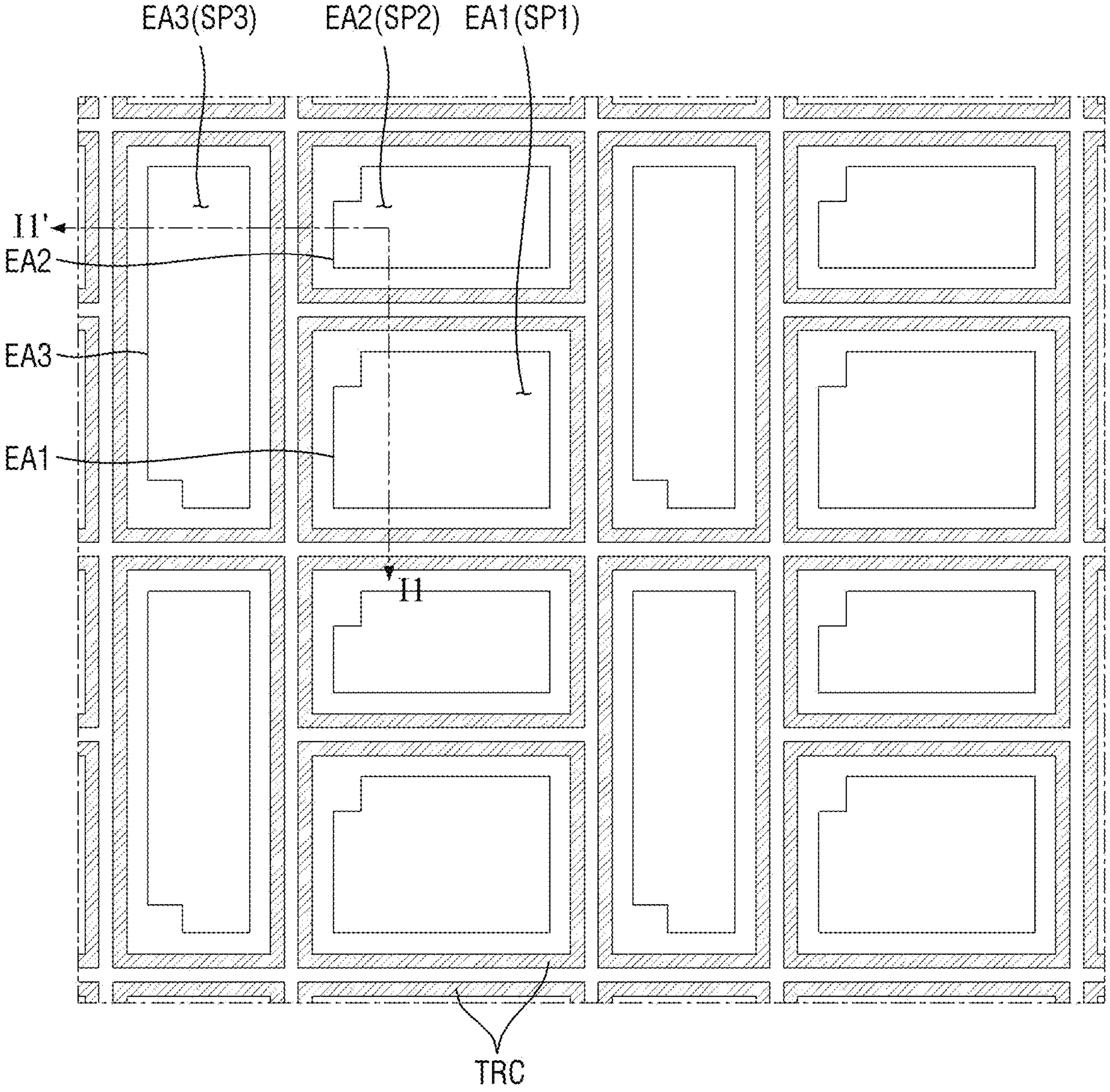
FIGS. 5 and 6 are layout diagrams illustrating embodiments of the display area of FIG. 4.
Figure 6:
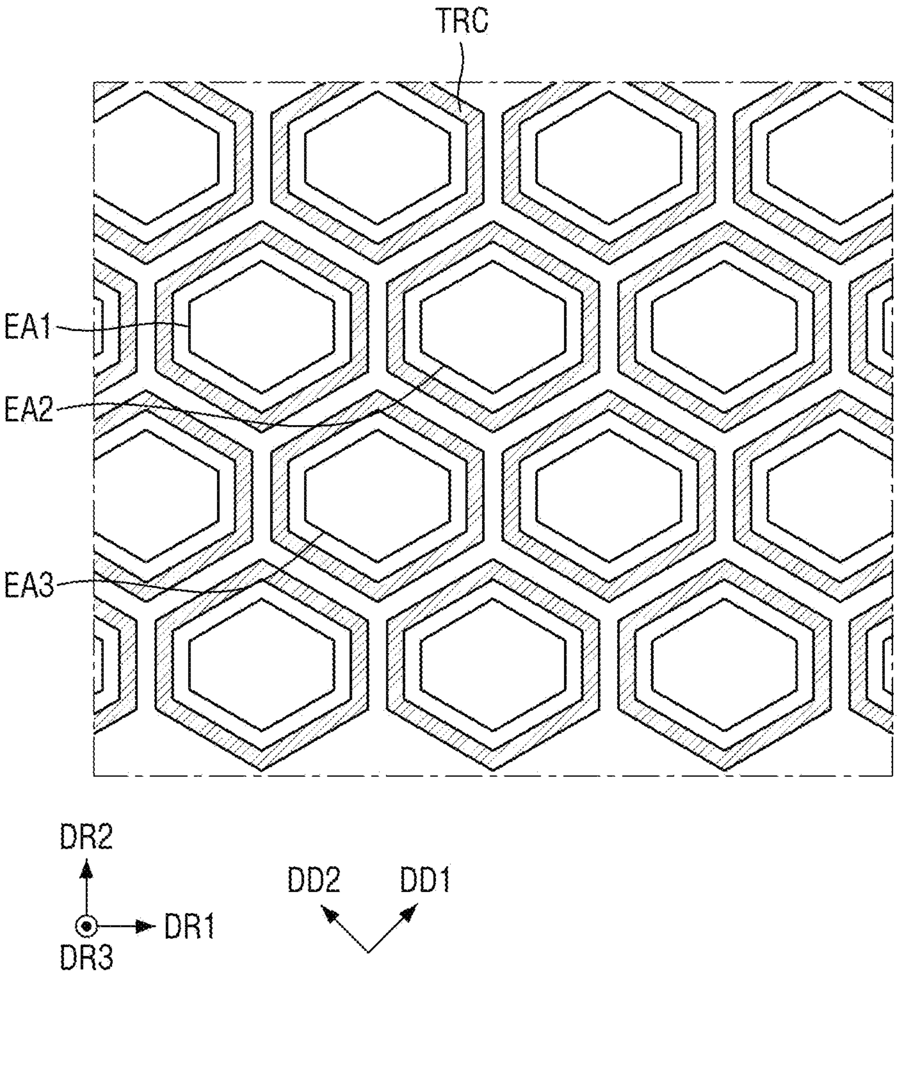

FIGS. 5 and 6 are layout diagrams illustrating embodiments of the display area of FIG. 4.

Referring to FIGS. 5 and 6, each of the pixels PX includes the first emission area EA1 that is an emission area of the first sub-pixel SP1, the second emission area EA2 that is an emission area of the second sub-pixel SP2, and the third emission area EA3 that is an emission area of the third sub-pixel SP3.

Each of the first emission area EA1, the second emission area EA2, and the third emission area EA3 may have a polygonal, circular, elliptical, and/or atypical shape in a plan view.

The maximum length of the third emission area EA3 in the first direction DR1 may be less than the maximum length of the second emission area EA2 in the first direction DR1 and the maximum length of the first emission area EA1 in the first direction DR1. The maximum length of the second emission area EA2 in the first direction DR1 and the maximum length of the first emission area EA1 in the first direction DR1 may be substantially the same.

The maximum length of the third emission area EA3 in the second direction DR2 may be greater than the maximum length of the second emission area EA2 in the second direction DR2 and the maximum length of the first emission area EA1 in the second direction DR2. The maximum length of the second emission area EA2 in the second direction DR2 may be greater than the maximum length of the first emission area EA1 in the second direction DR2. The maximum length of the first emission area EA1 in the second direction DR2 may be greater than the maximum length of the second emission area EA2 in the second direction DR2.

The first emission area EA1, the second emission area EA2, and the third emission area EA3 may have, in a plan view, a hexagonal shape formed of six straight lines as shown in FIGS. 5 and 6, but the present disclosure is not limited thereto. The first emission area EA1, the second emission area EA2, and the third emission area EA3 may have a polygonal shape other than a hexagon, a circular shape, an elliptical shape, and/or an atypical shape in a plan view.

As shown in FIG. 5, in each of the plurality of pixels PX, the first emission area EA1 and the second emission area EA2 may be adjacent to each other in the second direction DR2. Further, the first emission area EA1 and the third emission area EA3 may be adjacent to each other in the first direction DR1. In addition, the second emission area EA2 and the third emission area EA3 may be adjacent to each other in the first direction DR1. The area of the first emission area EA1, the area of the second emission area EA2, and the area of the third emission area EA3 may be different.

Alternatively, as shown in FIG. 6, the first emission area EA1 and the second emission area EA2 may be adjacent to each other in the first direction DR1, but the second emission area EA2 and the third emission area EA3 may be adjacent to each other in a first diagonal direction DD1, and the first emission area EA1 and the third emission area EA3 may be adjacent to each other in a second diagonal direction DD2. The first diagonal direction DD1 may be a direction between the first direction DR1 and the second direction DR2, and may refer to a direction inclined by 45 degrees with respect to the first direction DR1 and the second direction DR2, and the second diagonal direction DD2 may be a direction perpendicular to the first diagonal direction DD1.

The first emission area EA1 may emit light of a first color, the second emission area EA2 may emit light of a second color, and the third emission area EA3 may emit light of a third color. Here, the light of the first color may be light of a blue wavelength band, the light of the second color may be light of a green wavelength band, and the light of the third color may be light of a red wavelength band. For example, the blue wavelength band may be a wavelength band of light whose main peak wavelength is in the range of about 370 nm to about 460 nm, the green wavelength band may be a wavelength band of light whose main peak wavelength is in the range of about 480 nm to about 560 nm, and the red wavelength band may be a wavelength band of light whose main peak wavelength is in the range of about 600 nm to about 750 nm.

It is shown as an example in FIGS. 5 and 6 that each of the plurality of pixels PX includes three emission areas EA1, EA2, and EA3, but the present disclosure is not limited thereto. That is, each of the plurality of pixels PX may include four or more emission areas.

In addition, the layout of the emission areas of the plurality of pixels PX is not limited to that illustrated in FIGS. 5 and 6. For example, the emission areas of the plurality of pixels PX may be disposed in a stripe structure in which the emission areas are arranged along the first direction DR1, a PENTILE® arrangement structure in which the emission areas are arranged in a diamond shape, or a hexagonal structure in which the emission areas having, in a plan view, a hexagonal shape are arranged side by side as shown in FIG. 6. PENTILE® is a registered trademark of Samsung Display Co., Ltd., Republic of Korea.

Figure 7:
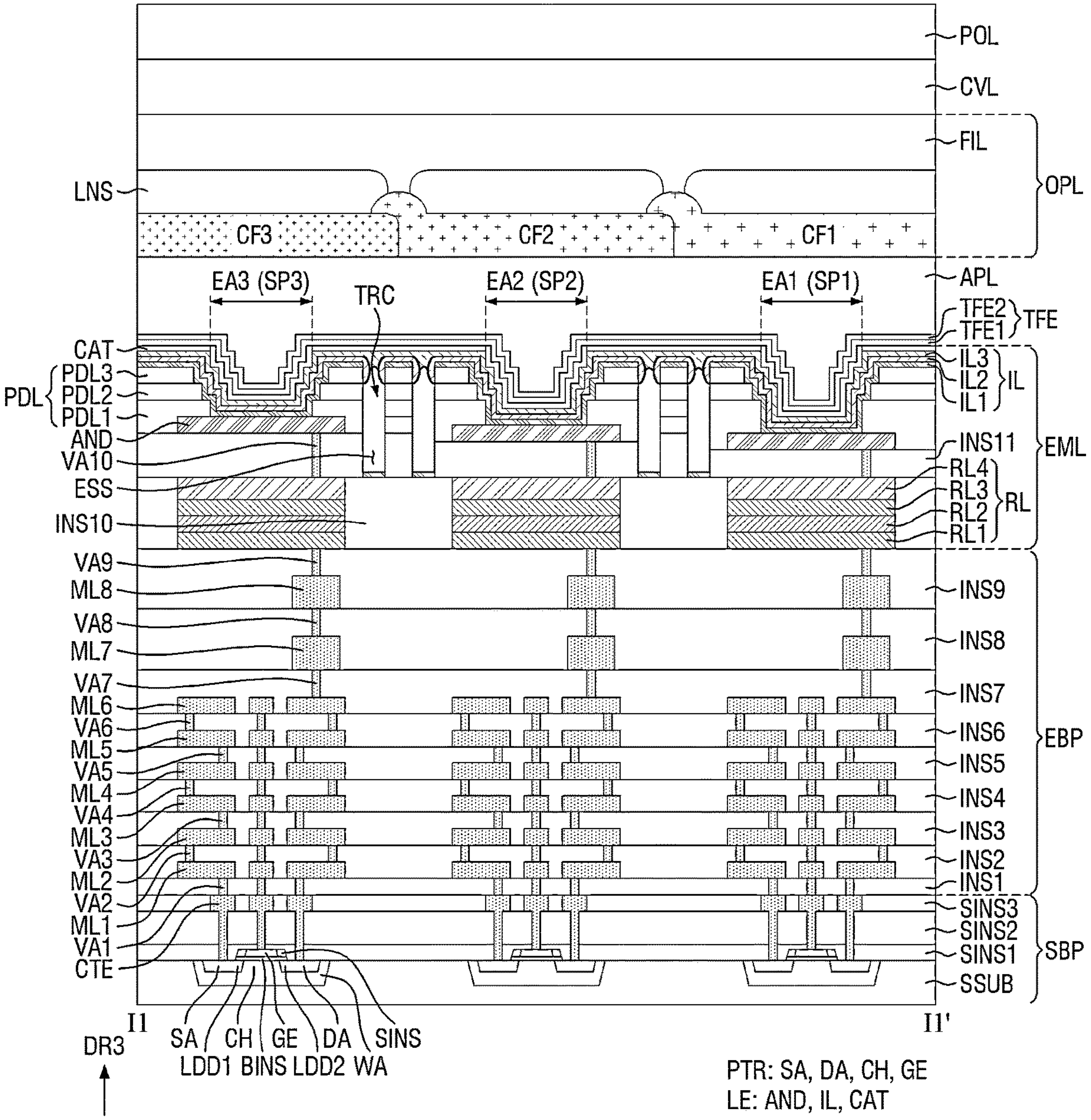
FIG. 7 is a cross-sectional view illustrating an example of a display panel taken along the line I1-I1' of FIG. 5.

FIG. 7 is a cross-sectional view illustrating an example of a display panel taken along the line I1-I1' of FIG. 5.

Referring to FIG. 7, the display panel 100 includes a semiconductor backplane SBP, a light emitting element backplane EBP, a display element layer EML, an encapsulation layer TFE, an optical layer OPL, a cover layer CVL, and a polarizing plate POL.

The semiconductor backplane SBP includes the semiconductor substrate SSUB including a plurality of pixel transistors PTR, a plurality of semiconductor insulating layers covering the plurality of pixel transistors PTR, and a plurality of contact terminals CTE electrically connected to the plurality of pixel transistors PTR, respectively. The plurality of pixel transistors PTR may be the first to sixth transistors T1 to T6 described with reference to FIG. 3.

The semiconductor substrate SSUB may be a silicon substrate, a germanium substrate, and/or a silicon-germanium substrate. The semiconductor substrate SSUB may be a substrate doped with a first type impurity. A plurality of well regions WA may be disposed on the top surface of the semiconductor substrate SSUB. The plurality of well regions WA may be regions doped with a second type impurity. The second type impurity may be different from the aforementioned first type impurity. For example, when the first type impurity is a p-type impurity, the second type impurity may be an n-type impurity. Alternatively, when the first type impurity is an n-type impurity, the second type impurity may be a p-type impurity.

Each of the plurality of well regions WA includes a source region SA corresponding to the source electrode of the pixel transistor PTR, a drain region DA corresponding to the drain electrode thereof, and a channel region CH disposed between the source region SA and the drain region DA.

A lower insulating layer BINS may be disposed between a gate electrode GE and the well region WA. A side insulating layer SINS may be disposed on the side surface of the gate electrode GE. The side insulating layer SINS may be disposed on the lower insulating layer BINS.

Each of the source region SA and the drain region DA may be a region doped with the first type impurity. The gate electrode GE of the pixel transistor PTR may overlap the well region WA in the third direction DR3. The channel region CH may overlap the gate electrode GE in the third direction DR3. The source region SA may be disposed on one side of the gate electrode GE, and the drain region DA may be disposed on the other side of the gate electrode GE.

Each of the plurality of well regions WA further includes a first low-concentration impurity region LDD1 disposed between the channel region CH and the source region SA, and a second low-concentration impurity region LDD2 disposed between the channel region CH and the drain region DA. The first low-concentration impurity region LDD1 may be a region having a lower impurity concentration than the source region SA due to the lower insulating layer BINS. The second low-concentration impurity region LDD2 may be a region having a lower impurity concentration than the drain region DA due to the lower insulating layer BINS. The distance between the source region SA and the drain region DA may increase due to the presence of the first low-concentration impurity region LDD1 and the second low-concentration impurity region LDD2. Therefore, the length of the channel region CH of each of the pixel transistors PTR may increase, so that punch-through and hot carrier phenomena that might be caused by a short channel may be reduced or prevented.

A first semiconductor insulating layer SINS1 may be disposed on the semiconductor substrate SSUB and the pixel transistor PTR. The first semiconductor insulating layer SINS1 may be formed of silicon carbonitride (SiCN) and/or a silicon oxide (SiOx)-based inorganic layer, but the present disclosure is not limited thereto.

A second semiconductor insulating layer SINS2 may be disposed on the first semiconductor insulating layer SINS1. The second semiconductor insulating layer SINS2 may be formed of a silicon oxide (SiOx)-based inorganic layer, but the present disclosure is not limited thereto.

The plurality of contact terminals CTE may be disposed on the second semiconductor insulating layer SINS2. Each of the plurality of contact terminals CTE may be connected to any one of the gate electrode GE, the source region SA, and the drain region DA of each of the pixel transistors PTR through holes penetrating the first semiconductor insulating layer SINS1 and the second semiconductor insulating layer INS2. The plurality of contact terminals CTE may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them.

A third semiconductor insulating layer SINS3 may be disposed on a side surface of each of the plurality of contact terminals CTE and on the second semiconductor insulating layer SINS2. The top surface of each of the plurality of contact terminals CTE may be exposed without being covered by the third semiconductor insulating layer SINS3. The third semiconductor insulating layer SINS3 may be formed of a silicon oxide (SiOx)-based inorganic layer, but the present disclosure is not limited thereto.

The semiconductor substrate SSUB may be replaced with a glass substrate and/or a polymer resin substrate such as polyimide. In this case, thin film transistors may be disposed on the glass substrate and/or the polymer resin substrate. The glass substrate may be a rigid substrate that does not bend, and the polymer resin substrate may be a flexible substrate that can be bent and/or curved.

The light emitting element backplane EBP includes a plurality of conductive layers ML1 to ML8, a plurality of vias VA1 to VA9, and a plurality of insulating layers INS1 to INS9. In addition, the light emitting element backplane EBP includes a plurality of insulating layers INS2 to INS8 disposed between the first to eighth conductive layers ML1 to ML8.

The first to eighth conductive layers ML1 to ML8 serve to connect the plurality of contact terminals CTE exposed from the semiconductor backplane SBP to thereby implement the circuit of the first sub-pixel SP1 shown in FIG. 3. For example, the first to sixth transistors T1 to T6 are merely formed on the semiconductor backplane SBP, and the connection of the first to sixth transistors T1 to T6 and the first and second capacitors CP1 and CP2 is accomplished through the first to eighth conductive layers ML1 to ML8. In addition, the connection between the drain region corresponding to the drain electrode of the fourth transistor T4, the source region corresponding to the source electrode of the fifth transistor T5, and the first electrode of the light emitting element LE is also accomplished through the first to eighth conductive layers ML1 to ML8.

The first insulating layer INS1 may be disposed on the third semiconductor insulating layer SINS3 of the semiconductor backplane SBP. Each of the first vias VA1 may penetrate the first insulating layer INS1 to be connected to the contact terminal CTE exposed from the semiconductor backplane SBP. Each of the first conductive layers ML1 may be disposed on the first insulating layer INS1 and may be connected to the first via VA1.

The second insulating layer INS2 may be disposed on the first insulating layer INS1 and the first conductive layers ML1. Each of the second vias VA2 may penetrate the second insulating layer INS2 and may be connected to the exposed first conductive layer ML1. Each of the second conductive layers ML2 may be disposed on the second insulating layer INS2 and may be connected to the second via VA2.

The third insulating layer INS3 may be disposed on the second insulating layer INS2 and the second conductive layers ML2. Each of the third vias VA3 may penetrate the third insulating layer INS3 and may be connected to the exposed second conductive layer ML2. Each of the third conductive layers ML3 may be disposed on the third insulating layer INS3 and may be connected to the third via VA3.

A fourth insulating layer INS4 may be disposed on the third insulating layer INS3 and the third conductive layers ML3. Each of the fourth vias VA4 may penetrate the fourth insulating layer INS4 and may be connected to the exposed third conductive layer ML3. Each of the fourth conductive layers ML4 may be disposed on the fourth insulating layer INS4 and may be connected to the fourth via VA4.

A fifth insulating layer INS5 may be disposed on the fourth insulating layer INS4 and the fourth conductive layers ML4. Each of the fifth vias VA5 may penetrate the fifth insulating layer INS5 and may be connected to the exposed fourth conductive layer ML4. Each of the fifth conductive layers ML5 may be disposed on the fifth insulating layer INS5 and may be connected to the fifth via VA5.

A sixth insulating layer INS6 may be disposed on the fifth insulating layer INS5 and the fifth conductive layers ML5. Each of the sixth vias VA6 may penetrate the sixth insulating layer INS6 and may be connected to the exposed fifth conductive layer ML5. Each of the sixth conductive layers ML6 may be disposed on the sixth insulating layer INS6 and may be connected to the sixth via VA6.

A seventh insulating layer INS7 may be disposed on the sixth insulating layer INS6 and the sixth conductive layers ML6. Each of the seventh vias VA7 may penetrate the seventh insulating layer INS7 and may be connected to the exposed sixth conductive layer ML6. Each of the seventh conductive layers ML7 may be disposed on the seventh insulating layer INS7 and may be connected to the seventh via VA7.

An eighth insulating layer INS8 may be disposed on the seventh insulating layer INS7 and the seventh conductive layers ML7. Each of the eighth vias VA8 may penetrate the eighth insulating layer INS8 and may be connected to the exposed seventh conductive layer ML7. Each of the eighth conductive layers ML8 may be disposed on the eighth insulating layer INS8 and may be connected to the eighth via VA8.

The first to eighth conductive layers ML1 to ML8 and the first to eighth vias VA1 to VA8 may be formed of substantially the same material. The first to eighth conductive layers ML1 to ML8 and the first to eighth vias VA1 to VA8 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. The first to eighth vias VA1 to VA8 may be made of substantially the same material. First to eighth insulating layers INS1 to INS8 may be formed of a silicon oxide (SiOx)-based inorganic layer, but the present disclosure is not limited thereto.

The thicknesses of the first conductive layer ML1, the second conductive layer ML2, the third conductive layer ML3, the fourth conductive layer ML4, the fifth conductive layer ML5, and the sixth conductive layer ML6 may be greater than the thicknesses of the first via VA1, the second via VA2, the third via VA3, the fourth via VA4, the fifth via VA5, and the sixth via VA6, respectively. The thickness of each of the second conductive layer ML2, the third conductive layer ML3, the fourth conductive layer ML4, the fifth conductive layer ML5, and the sixth conductive layer ML6 may be greater than the thickness of the first conductive layer ML1. The thickness of the second conductive layer ML2, the thickness of the third conductive layer ML3, the thickness of the fourth conductive layer ML4, the thickness of the fifth conductive layer ML5, and the thickness of the sixth conductive layer ML6 may be substantially the same. For example, the thickness of the first conductive layer ML1 may be approximately 1360 Å; the thickness of each of the second conductive layer ML2, the third conductive layer ML3, the fourth conductive layer ML4, the fifth conductive layer ML5, and the sixth conductive layer ML6 may be approximately 1440 Å; and the thickness of each of the first via VA1, the second via VA2, the third via VA3, the fourth via VA4, the fifth via VA5, and the sixth via VA6 may be approximately 1150 Å. However, in one or more embodiments, the thickness of one or more, or each, of the second conductive layer ML2, the third conductive layer ML3, the fourth conductive layer ML4, the fifth conductive layer ML5, and the sixth conductive layer ML6 may be substantially the same as the thickness of the first conductive layer ML1.

The thickness of each of the seventh conductive layer ML7 and the eighth conductive layer ML8 may be greater than the thickness of the first conductive layer ML1, the thickness of the second conductive layer ML2, the thickness of the third conductive layer ML3, the thickness of the fourth conductive layer ML4, the thickness of the fifth conductive layer ML5, and the thickness of the sixth conductive layer ML6. The thickness of the seventh conductive layer ML7 and the thickness of the eighth conductive layer ML8 may be greater than the thickness of the seventh via VA7 and the thickness of the eighth via VA8, respectively. The thickness of each of the seventh via VA7 and the eighth via VA8 may be greater than the thickness of the first via VA1, the thickness of the second via VA2, the thickness of the third via VA3, the thickness of the fourth via VA4, the thickness of the fifth via VA5, and the thickness of the sixth via VA6. The thickness of the seventh conductive layer ML7 and the thickness of the eighth conductive layer ML8 may be substantially the same. For example, the thickness of each of the seventh conductive layer ML7 and the eighth conductive layer ML8 may be approximately 9000 Å. The thickness of each of the seventh via VA7 and the eighth via VA8 may be approximately 6000 Å.

The ninth insulating layer INS9 may be disposed on the eighth insulating layer INS8 and the eighth conductive layer ML8. The ninth insulating layer INS9 may be formed of a silicon oxide (SiOx)-based inorganic layer, but the present disclosure is not limited thereto.

Each of the ninth vias VA9 may penetrate the ninth insulating layer INS9 and may be connected to the exposed eighth conductive layer ML8. The ninth vias VA9 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. The thickness of the ninth via VA9 may be approximately 16500 Å.

The display element layer EML may be disposed on the light emitting element backplane EBP. The display element layer EML may include a reflective electrode layer RL, tenth and eleventh insulating layers INS10 and INS11, a tenth via VA10, and light emitting elements LE each including the first electrode AND, a light emitting stack IL, and a second electrode CAT. The display element layer EML may also include a pixel defining layer PDL; and a plurality of trenches TRC.

The reflective electrode layer RL may be disposed on the ninth insulating layer INS9. The reflective electrode layer RL may include at least one reflective electrode RL1, RL2, RL3, and/or RL4. For example, the reflective electrode layer RL may include first to fourth reflective electrodes RL1, RL2, RL3, and RL4 as shown in FIG. 7.

Each of the first reflective electrodes RL1 may be disposed on the ninth insulating layer INS9, and may be connected to the ninth via VA9. The first reflective electrodes RL1 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. For example, the first reflective electrodes RL1 may include titanium nitride (TiN).

Each of second reflective electrodes RL2 may be disposed on the first reflective electrode RL1. The second reflective electrodes RL2 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. For example, the second reflective electrodes RL2 may include aluminum (Al).

Each of the third reflective electrodes RL3 may be disposed on the second reflective electrode RL2. The third reflective electrodes RL3 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. For example, the third reflective electrodes RL3 may include titanium nitride (TiN).

The fourth reflective electrodes RL4 may be respectively disposed on the third reflective electrodes RL3. The fourth reflective electrodes RL4 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. For example, the fourth reflective electrodes RL4 may include titanium (Ti).

Because, in one or more embodiments, the second reflective electrode RL2 is an electrode that substantially reflects light from the light emitting elements LE, the thickness of the second reflective electrode RL2 may be greater than the thickness of each of the first reflective electrode RL1, the third reflective electrode RL3, and the fourth reflective electrode RL4. For example, the thickness of each of the first reflective electrode RL1, the third reflective electrode RL3, and the fourth reflective electrode RL4 may be approximately 100 Å, and the thickness of the second reflective electrode RL2 may be approximately 850 Å. In one or more embodiments, as shown in FIG. 7, the thickness of the second reflective electrode RL2 may be substantially the same as the thickness of one or more, or each, of the first reflective electrode RL1, the third reflective electrode RL3, and the fourth reflective electrode RL4.

The tenth insulating layer INS10 may be disposed on the ninth insulating layer INS9. The tenth insulating layer INS10 may be disposed between the reflective electrode layers RL adjacent to each other in a horizontal direction. In one or more embodiments, the tenth insulating layer INS10 may be disposed on the reflective electrode layer RL in the third sub-pixel SP3. The tenth insulating layer INS10 may be formed of a silicon oxide (SiOx)-based inorganic layer, but the present disclosure is not limited thereto.

The eleventh insulating layer INS11 may be disposed on the tenth insulating layer INS10 and the reflective electrode layer RL. The eleventh insulating layer INS11 may be formed of a silicon oxide (SiOx)-based inorganic layer, but the present disclosure is not limited thereto. The tenth insulating layer INS10 and the eleventh insulating layer INS11 may be an optical auxiliary layer through which light reflected by the reflective electrode layer RL passes, from among light emitted from the light emitting elements LE.

In order to match the resonance distance of the light emitted from the light emitting elements LE in at least one of the first sub-pixel SP1, in one or more embodiments, the second sub-pixel SP2, or the third sub-pixel SP3, the tenth insulating layer INS10 and the eleventh insulating layer INS11 may not be disposed under the first electrode AND of the first sub-pixel SP1. In one or more embodiments, the first electrode AND of the first sub-pixel SP1 may be directly disposed on the reflective electrode layer RL. The eleventh insulating layer INS11 may be disposed under the first electrode AND of the second sub-pixel SP2. In one or more embodiments, the tenth insulating layer INS10 and the eleventh insulating layer INS11 may be disposed under the first electrode AND of the third sub-pixel SP3. However, in one or more other embodiments, as shown in FIG. 7, the eleventh insulating layer INS11 may be disposed under the first electrode AND of each of the first to third sub-pixels SP1-SP3

In summary, in one or more embodiments, the distance between the first electrode AND and the reflective electrode layer RL may be different in the first sub-pixel SP1, the second sub-pixel SP2, and the third sub-pixel SP3. That is, in order to adjust the distance from the reflective electrode layer RL to the second electrode CAT according to the main wavelength of the light emitted from each of the first sub-pixel SP1, the second sub-pixel SP2, and the third sub-pixel SP3, the presence or absence of the tenth insulating layer INS10 and the eleventh insulating layer INS11 may be set in each of the first sub-pixel SP1, the second sub-pixel SP2, and the third sub-pixel SP3. For example, it is illustrated in FIG. 7 that the distance between the first electrode AND and the reflective electrode layer RL in the third sub-pixel SP3 is larger than the distance between the first electrode AND and the reflective electrode layer RL in the second sub-pixel SP2 and the distance between the first electrode AND and the reflective electrode layer RL in the first sub-pixel SP1, and the distance between the first electrode AND and the reflective electrode layer RL in the second sub-pixel SP2 is larger than the distance between the first electrode AND and the reflective electrode layer RL in the first sub-pixel SP1, but the present disclosure is not limited thereto.

In addition, although the tenth insulating layer INS10 and the eleventh insulating layer INS11 are illustrated in the embodiment of the present disclosure, a twelfth insulating layer disposed under the first electrode AND of the first sub-pixel SP1 may be added. In this case, the eleventh insulating layer INS11 and the twelfth insulating layer may be disposed under the first electrode AND of the second sub-pixel SP2, and the tenth insulating layer INS10, the eleventh insulating layer INS11, and the twelfth insulating layer may be disposed under the first electrode AND of the third sub-pixel SP3.

In one or more embodiments, each of the tenth vias VA10 may penetrate the tenth insulating layer INS10 and/or the eleventh insulating layer INS11 in the second sub-pixel SP2 and the third sub-pixel SP3 and may be connected to the exposed reflective electrode layer RL. In one or more other embodiments, as shown in FIG. 7, each of the tenth vias VA10 may penetrate the eleventh insulating layer INS11 in the first sub-pixel, the second sub-pixel SP2, and the third sub-pixel SP3 and may be connected to the exposed reflective electrode layer RL. The tenth vias VA10 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. The thickness of the tenth via VA10 in the second sub-pixel SP2 may be smaller than the thickness of the tenth via VA10 in the third sub-pixel SP3.

The first electrode AND of each of the light emitting elements LE may be disposed on the eleventh insulating layer INS11 and connected to the tenth via VA10. The first electrode AND of each of the light emitting elements LE may be connected to the drain region DA or source region SA of the pixel transistor PTR through the tenth via VA10, the first to fourth reflective electrodes RL1 to RL4, the first to ninth vias VA1 to VA9, the first to eighth conductive layers ML1 to ML8, and the contact terminal CTE. The first electrode AND of each of the light emitting elements LE may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more of them. For example, the first electrode AND of each of the light emitting elements LE may be titanium nitride (TiN).

The pixel defining layer PDL may be disposed on a part of the first electrode AND of each of the light emitting elements LE. The pixel defining layer PDL may cover the edge of the first electrode AND of each of the light emitting elements LE. The pixel defining layer PDL may serve to partition the first emission areas EA1, the second emission areas EA2, and the third emission areas EA3.

The first emission area EA1 may be defined as an area in which the first electrode AND, the light emitting stack IL, and the second electrode CAT are sequentially stacked in the first sub-pixel SP1 to emit light. The second emission area EA2 may be defined as an area in which the first electrode AND, the light emitting stack IL, and the second electrode CAT are sequentially stacked in the second sub-pixel SP2 to emit light. The third emission area EA3 may be defined as an area in which the first electrode AND, the light emitting stack IL, and the second electrode CAT are sequentially stacked in the third sub-pixel SP3 to emit light.

The pixel defining layer PDL may include first to third pixel defining layers PDL1, PDL2, and PDL3. The first pixel defining layer PDL1 may be disposed on the edge of the first electrode AND of each of the light emitting elements LE, the second pixel defining layer PDL2 may be disposed on the first pixel defining layer PDL1, and the third pixel defining layer PDL3 may be disposed on the second pixel defining layer PDL2. The first pixel defining layer PDL1, the second pixel defining layer PDL2, and the third pixel defining layer PDL3 may be formed of a silicon oxide (SiOx)-based inorganic layer, but the present disclosure is not limited thereto. The first pixel defining layer PDL1, the second pixel defining layer PDL2, and the third pixel defining layer PDL3 may each have a thickness of about 500 Å.

When the first pixel defining layer PDL1, the second pixel defining layer PDL2, and the third pixel defining layer PDL3 are formed as one pixel defining layer, the height of the one pixel defining layer increases, so that a first encapsulation inorganic layer TFE1 may be cut off due to step coverage. Step coverage refers to the ratio of the degree of thin film coated on an inclined portion to the degree of thin film coated on a flat portion. The lower the step coverage, the more likely it is that the thin film will be cut off at inclined portions.

Therefore, in order to prevent or reduce the first encapsulation inorganic layer TFE1 from being cut off due to the step coverage, the first pixel defining layer PDL1, the second pixel defining layer PDL2, and the third pixel defining layer PDL3 may have a cross-sectional structure having a stepped portion. For example, the width of the first pixel defining layer PDL1 may be greater than the width of the second pixel defining layer PDL2 and the width of the third pixel defining layer PDL3, and the width of the second pixel defining layer PDL2 may be greater than the width of the third pixel defining layer PDL3. The width of the first pixel defining layer PDL1 refers to the horizontal length of the first pixel defining layer PDL1 defined in the first direction DR1 and the second direction DR2.

Each of the plurality of trenches TRC may penetrate the first pixel defining layer PDL1, the second pixel defining layer PDL2, and the third pixel defining layer PDL3. Furthermore, each of the plurality of trenches TRC may penetrate the eleventh insulating layer INS11. In one or more embodiments, the tenth insulating layer INS10 may be partially recessed at each of the plurality of trenches TRC.

At least one trench TRC may be disposed between adjacent sub-pixels SP1, SP2, and SP3. Although FIG. 7 illustrates that two trenches TRC are disposed between adjacent sub-pixels SP1, SP2, and SP3, the present disclosure is not limited thereto.

The light emitting stack IL may include a plurality of intermediate layers. FIG. 7 illustrates that the light emitting stack IL has a three-tandem structure including the first stack layer IL1, the second stack layer IL2, and the third stack layer IL3, but the present disclosure is not limited thereto. For example, the light emitting stack IL may have a two-tandem structure including two intermediate layers.

In the three-tandem structure, the light emitting stack IL may have a tandem structure including a plurality of stack layers IL1, IL2, and IL3 that emit different lights. For example, the light emitting stack IL may include the first stack layer IL1 that emits light of the first color, the second stack layer IL2 that emits light of the third color, and the third stack layer IL3 that emits light of the second color. The first stack layer IL1, the second stack layer IL2, and the third stack layer IL3 may be sequentially stacked.

The first stack layer IL1 may have a structure in which a first hole transport layer, a first organic light emitting layer that emits light of the first color, and a first electron transport layer are sequentially stacked. The second stack layer IL2 may have a structure in which a second hole transport layer, a second organic light emitting layer that emits light of the third color, and a second electron transport layer are sequentially stacked. The third stack layer IL3 may have a structure in which a third hole transport layer, a third organic light emitting layer that emits light of the second color, and a third electron transport layer are sequentially stacked.

A first charge generation layer for supplying charges to the second stack layer IL2 and supplying electrons to the first stack layer IL1 may be disposed between the first stack layer IL1 and the second stack layer IL2. The first charge generation layer may include an N-type charge generation layer that supplies electrons to the first stack layer IL1 and a P-type charge generation layer that supplies holes to the second stack layer IL2. The N-type charge generation layer may include a dopant of a metal material.

A second charge generation layer for supplying charges to the third stack layer IL3 and supplying electrons to the second stack layer IL2 may be disposed between the second stack layer IL2 and the third stack layer IL3. The second charge generation layer may include an N-type charge generation layer that supplies electrons to the second stack layer IL2 and a P-type charge generation layer that supplies holes to the third stack layer IL3.

The first stack layer IL1 may be disposed on the first electrodes AND and the pixel defining layer PDL, and may be disposed on the bottom surface of each trench TRC. Due to the trench TRC, the first stack layer IL1 may be cut off between adjacent sub-pixels SP1, SP2, and SP3. The second stack layer IL2 may be disposed on the first stack layer IL1. Due to the trench TRC, the second stack layer IL2 may be cut off between adjacent sub-pixels SP1, SP2, and SP3. A cavity ESS or an empty space may be disposed between the first stack layer IL1 and the second stack layer IL2. The third stack layer IL3 may be disposed on the second stack layer IL2. The third stack layer IL3 is not cut off by the trench TRC and may be disposed to cover the second stack layer IL2 in each of the trenches TRC. That is, in the three-tandem structure, each of the plurality of trenches TRC may be a structure for cutting off the first to second stack layers IL1 and IL2, the first charge generation layer, and the second charge generation layer of the display element layer EML between the sub-pixels SP1, SP2, and SP3 adjacent to each other. In addition, in the two-tandem structure, each of the trenches TRC may be a structure for cutting off the charge generation layer disposed between a lower intermediate layer and an upper intermediate layer, and the lower intermediate layer.

In order to stably cut off the first and second stack layers IL1 and IL2 of the display element layer EML between adjacent sub-pixels SP1, SP2, and SP3, the height of each of the plurality of trenches TRC may be greater than the height of the pixel defining layer PDL. The height of each of the plurality of trenches TRC refers to the length of each of the plurality of trenches TRC in the third direction DR3. The height of the pixel defining layer PDL refers to the length of the pixel defining layer PDL in the third direction DR3. In order to cut off the first to third stack layers IL1, IL2, and IL3 of the display element layer EML between the neighboring sub-pixels SP1, SP2, and SP3, another structure may exist instead of the trench TRC. For example, instead of the trench TRC, a reverse tapered partition wall may be disposed on the pixel defining layer PDL.

The number of the stack layers IL1, IL2, and IL3 that emit different lights is not limited to that shown in FIG. 7. For example, the light emitting stack IL may include two intermediate layers. In this case, one of the two intermediate layers may be substantially the same as the first stack layer IL1, and the other may include a second hole transport layer, a second organic light emitting layer, a third organic light emitting layer, and a second electron transport layer. In this case, a charge generation layer for supplying electrons to one intermediate layer and supplying charges to the other intermediate layer may be disposed between the two intermediate layers.

In addition, FIG. 7 illustrates that the first to third stack layers IL1, IL2, and IL3 are all disposed in the first emission area EA1, the second emission area EA2, and the third emission area EA3, but the present disclosure is not limited thereto. For example, in one or more embodiments, the first stack layer IL1 may be disposed in the first emission area EA1, and may not be disposed in the second emission area EA2 and the third emission area EA3. Furthermore, in one or more embodiments, the second stack layer IL2 may be disposed in the second emission area EA2 and may not be disposed in the first emission area EA1 and the third emission area EA3. Further, the third stack layer IL3 may be disposed in the third emission area EA3 and may not be disposed in the first emission area EA1 and the second emission area EA2. In this case, first to third color filters CF1, CF2, and CF3 of the optical layer OPL may be omitted.

The second electrode CAT may be disposed on the third stack layer IL3. The second electrode CAT may be disposed on the third stack layer IL3 in each of the plurality of trenches TRC. The second electrode CAT may be formed of a transparent conductive material (TCO) such as ITO and/or IZO that can transmit light or a semi-transmissive conductive material such as magnesium (Mg), silver (Ag), and/or an alloy of Mg and Ag. When the second electrode CAT is formed of a semi-transmissive conductive material, the light emission efficiency may be improved in each of the first to third sub-pixels SP1, SP2, and SP3 due to a micro-cavity effect.

The encapsulation layer TFE may be disposed on the display element layer EML. The encapsulation layer TFE may include at least one inorganic layer TFE1 and TFE2 to prevent oxygen and/or moisture from permeating into the display element layer EML. For example, the encapsulation layer TFE may include the first encapsulation inorganic layer TFE1, and a second encapsulation inorganic layer TFE2.

The first encapsulation inorganic layer TFE1 may be disposed on the second electrode CAT. The first encapsulation inorganic layer TFE1 may be formed as a multilayer in which one or more inorganic layers selected from silicon nitride (SiNx), silicon oxy nitride (SiON), and/or silicon oxide (SiOx) are alternately stacked. The first encapsulation inorganic layer TFE1 may be formed by a chemical vapor deposition (CVD) process.

The second encapsulation inorganic layer TFE2 may be disposed on the first encapsulation inorganic layer TFE1. The second encapsulation inorganic layer TFE2 may be formed of titanium oxide (TiOx) and/or aluminum oxide (AlOx), but the present disclosure is not limited thereto. The second encapsulation inorganic layer TFE2 may be formed by an atomic layer deposition (ALD) process. The thickness of the second encapsulation inorganic layer TFE2 may be smaller than the thickness of the first encapsulation inorganic layer TFE1.

An organic layer APL may be a layer for increasing the interfacial adhesion between the encapsulation layer TFE and the optical layer OPL. The organic layer APL may be an organic layer such as acrylic resin, epoxy resin, phenolic resin, polyamide resin, and/or polyimide resin.

The optical layer OPL includes a plurality of color filters CF1, CF2, and CF3, a plurality of lenses LNS, and a filling layer FIL. The plurality of color filters CF1, CF2, and CF3 may include the first to third color filters CF1, CF2, and CF3. The first to third color filters CF1, CF2, and CF3 may be disposed on the organic layer APL.

The first color filter CF1 may overlap the first emission area EA1 of the first sub-pixel SP1. The first color filter CF1 may transmit light of the first color, i.e., light of a blue wavelength band. The blue wavelength band may be approximately 370 nm to 460 nm. Thus, the first color filter CF1 may transmit light of the first color from among light emitted from the first emission area EA1.

The second color filter CF2 may overlap the second emission area EA2 of the second sub-pixel SP2. The second color filter CF2 may transmit light of the second color, i.e., light of a green wavelength band. The green wavelength band may be approximately 480 nm to 560 nm. Thus, the second color filter CF2 may transmit light of the second color from among light emitted from the second emission area EA2.

The third color filter CF3 may overlap the third emission area EA3 of the third sub-pixel SP3. The third color filter CF3 may transmit light of the third color, i.e., light of a red wavelength band. The red wavelength band may be approximately 600 nm to 750 nm. Thus, the third color filter CF3 may transmit light of the third color from among light emitted from the third emission area EA3.

The plurality of lenses LNS may be disposed on the first color filter CF1, the second color filter CF2, and the third color filter CF3, respectively. Each of the plurality of lenses LNS may be a structure for increasing a ratio of light directed to the front of the display device 10. Each of the plurality of lenses LNS may have a cross-sectional shape that is convex in an upward direction.

The filling layer FIL may be disposed on the plurality of lenses LNS. The filling layer FIL may have a suitable refractive index (e.g., a predetermined refractive index) such that light travels in the third direction DR3 at an interface between the filling layer FIL and the plurality of lenses LNS. Further, the filling layer FIL may be a planarization layer. The filling layer FIL may be an organic layer such as acrylic resin, epoxy resin, phenolic resin, polyamide resin, and/or polyimide resin.

The cover layer CVL may be disposed on the filling layer FIL. The cover layer CVL may be a glass substrate and/or a polymer resin. When the cover layer CVL is a glass substrate, it may be attached onto the filling layer FIL. In this case, the filling layer FIL may serve to bond the cover layer CVL. When the cover layer CVL is a glass substrate, it may serve as an encapsulation substrate. When the cover layer CVL is a polymer resin, it may be directly applied onto the filling layer FIL.

A polarizing plate POL may be disposed on one surface of the cover layer CVL. The polarizing plate POL may be a structure for preventing visibility degradation caused by reflection of external light. The polarizing plate POL may include a linear polarizing plate and a phase retardation film. For example, the phase retardation film may be a $\lambda/4$ plate (quarter-wave plate), but the present disclosure is not limited thereto. However, when visibility degradation caused by reflection of external light is sufficiently overcome by the first to third color filters CF1, CF2, and CF3, the polarizing plate POL may be omitted.

Figure 8:
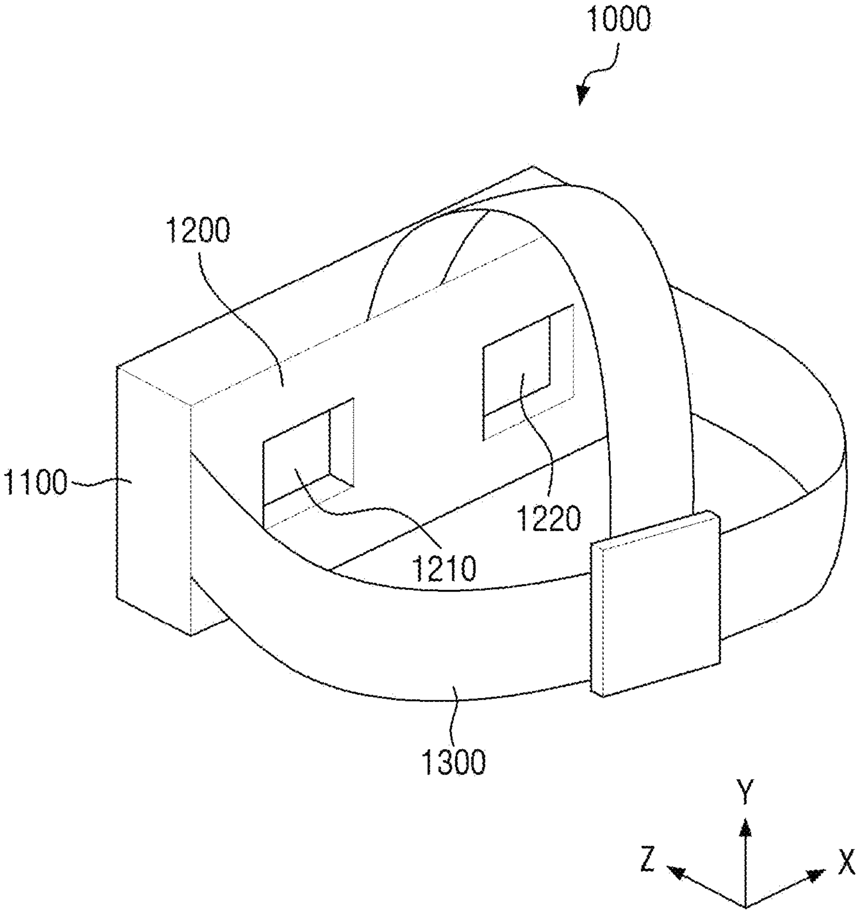
FIG. 8 is a perspective view illustrating a head mounted display according to one or more embodiments.
Figure 9:
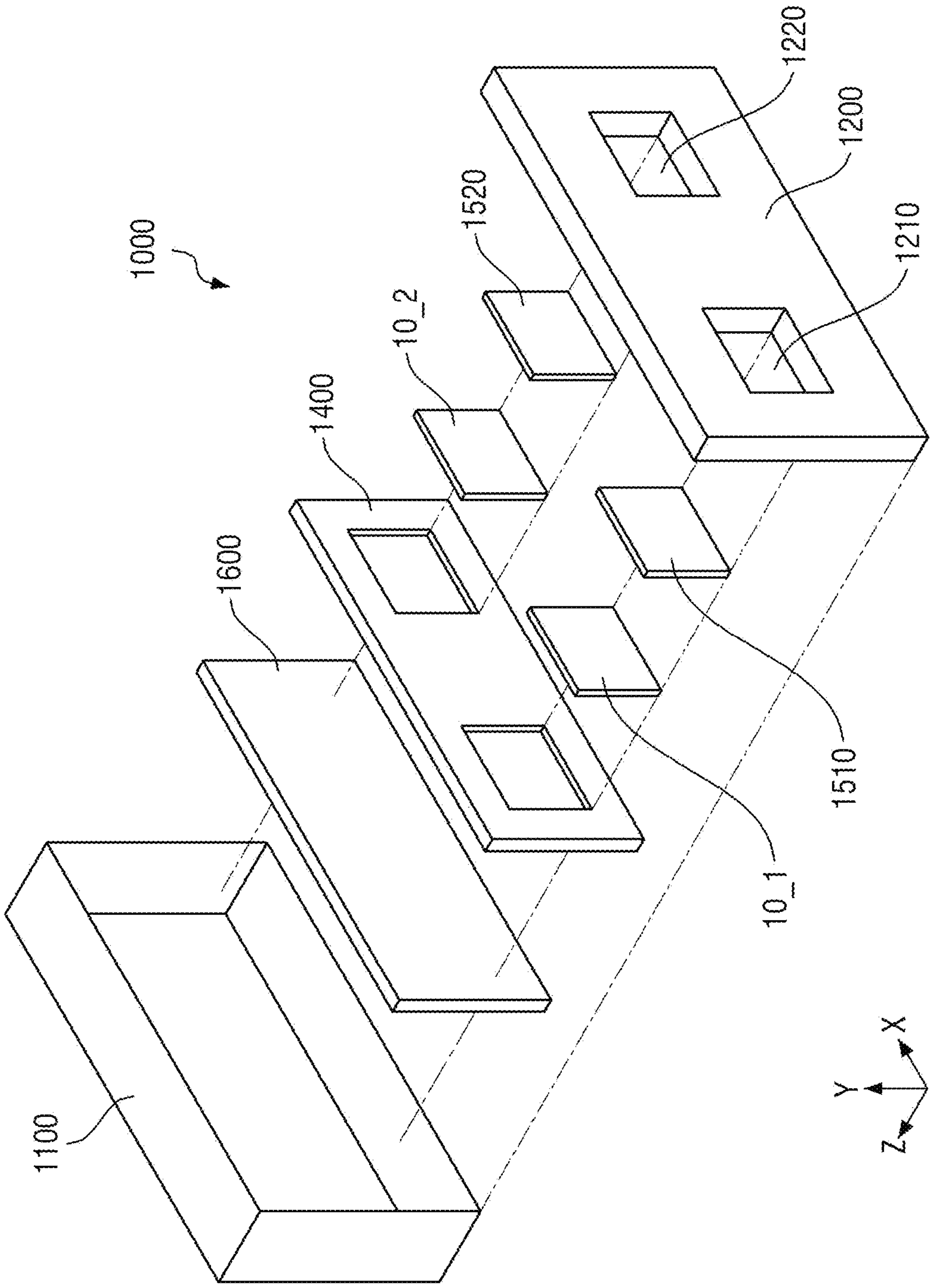
FIG. 9 is an exploded perspective view illustrating an example of the head mounted display of FIG. 8.

FIG. 8 is a perspective view illustrating a head mounted display according to one or more embodiments. FIG. 9 is an exploded perspective view illustrating an example of the head mounted display of FIG. 8.

Referring to FIGS. 8 and 9, a head mounted display 1000 according to one or more embodiments includes a first display device 10_1, a second display device 10_2, a display device housing 1100, a housing cover 1200, a first eyepiece 1210, a second eyepiece 1220, a head mounted band 1300, a middle frame 1400, a first optical member 1510, a second optical member 1520, and a control circuit board 1600.

The first display device 10_1 provides an image to the user's left eye, and the second display device 10_2 provides an image to the user's right eye. Because each of the first display device 10_1 and the second display device 10_2 is substantially the same as the display device 10 described in conjunction with FIGS. 1 and 2, a description of the first display device 10_1 and the second display device 10_2 will be omitted.

The first optical member 1510 may be disposed between the first display device 10_1 and the first eyepiece 1210. The second optical member 1520 may be disposed between the second display device 10_2 and the second eyepiece 1220. Each of the first optical member 1510 and the second optical member 1520 may include at least one convex lens.

The middle frame 1400 may be disposed between the first display device 10_1 and the control circuit board 1600 and between the second display device 10_2 and the control circuit board 1600. The middle frame 1400 serves to support and fix the first display device 10_1, the second display device 10_2, and the control circuit board 1600.

The control circuit board 1600 may be disposed between the middle frame 1400 and the display device housing 1100. The control circuit board 1600 may be connected to the first display device 10_1 and the second display device 10_2 through the connector. The control circuit board 1600 may convert an image source inputted from the outside into digital video data DATA, and transmit the digital video data DATA to the first display device 10_1 and the second display device 10_2 through the connector.

The control circuit board 1600 may transmit the digital video data DATA corresponding to a left-eye image optimized for the user's left eye to the first display device 10_1, and may transmit the digital video data DATA corresponding to a right-eye image optimized for the user's right eye to the second display device 10_2. Alternatively, the control circuit board 1600 may transmit the same digital video data DATA to the first display device 10_1 and the second display device 10_2.

The display device housing 1100 serves to accommodate the first display device 10_1, the second display device 10_2, the middle frame 1400, the first optical member 1510, the second optical member 1520, and the control circuit board 1600. The housing cover 1200 is disposed to cover one open surface of the display device housing 1100. The housing cover 1200 may include the first eyepiece 1210 at which the user's left eye is disposed and the second eyepiece 1220 at which the user's right eye is disposed. FIGS. 8 and 9 illustrate that the first eyepiece 1210 and the second eyepiece 1220 are disposed separately, but the present disclosure is not limited thereto. The first eyepiece 1210 and the second eyepiece 1220 may be combined into one.

The first eyepiece 1210 may be aligned with the first display device 10_1 and the first optical member 1510, and the second eyepiece 1220 may be aligned with the second display device 10_2 and the second optical member 1520. Therefore, the user may view, through the first eyepiece 1210, the image of the first display device 10_1 magnified as a virtual image by the first optical member 1510, and may view, through the second eyepiece 1220, the image of the second display device 10_2 magnified as a virtual image by the second optical member 1520.

The head mounted band 1300 serves to secure the display device housing 1100 to the user's head such that the first eyepiece 1210 and the second eyepiece 1220 of the housing cover 1200 remain disposed on the user's left and right eyes, respectively. When the display device housing 1200 is implemented to be lightweight and compact, the head mounted display 1000 may be provided with, as shown in FIG. 10, an eyeglass frame instead of the head mounted band 1300.

In addition, the head mounted display 1000 may further include a battery for supplying power, an external memory slot for accommodating an external memory, and an external connection port and a wireless communication module for receiving an image source. The external connection port may be a universe serial bus (USB) terminal, a display port, and/or a high-definition multimedia interface (HDMI) terminal, and the wireless communication module may be a 5G communication module, a 4G communication module, a Wi-Fi module, and/or a Bluetooth module.

Figure 10:
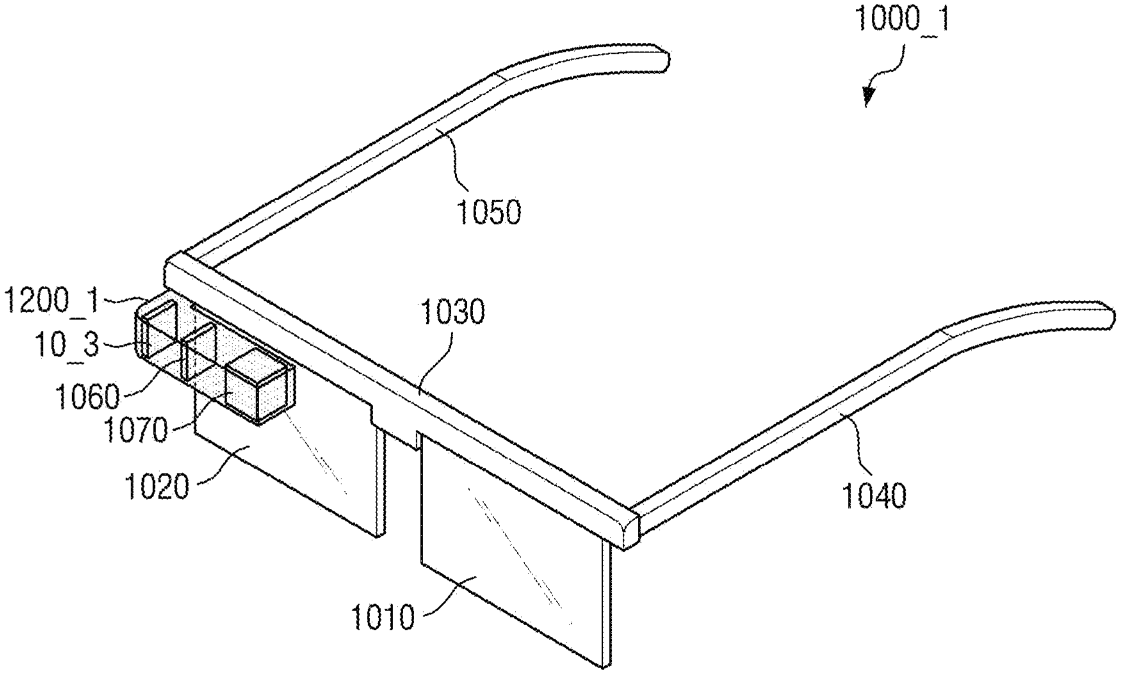
FIG. 10 is a perspective view illustrating a head mounted display according to one or more embodiments.

FIG. 10 is a perspective view illustrating a head mounted display according to one or more embodiments.

Referring to FIG. 10, a head mounted display 1000_1 according to one or more embodiments may be an eyeglasses-type display device in which a display device housing 1200_1 is implemented in a lightweight and compact manner. The head mounted display 1000_1 according to one or more embodiments may include a display device 10_3, a left eye lens 1010, a right eye lens 1020, a support frame 1030, temples 1040 and 1050, an optical member 1060, an optical path changing member 1070, and the display device housing 1200_1.

The display device housing 1200_1 may include the display device 10_3, the optical member 1060, and the optical path changing member 1070. The image displayed on the display device 10_3 may be magnified by the optical member 1060, and may be provided to the user's right eye through the right eye lens 1020 after the optical path thereof is changed by the optical path changing member 1070. As a result, the user may view an augmented reality image, through the right eye, in which a virtual image displayed on the display device 10_3 and a real image seen through the right eye lens 1020 are combined.

FIG. 10 illustrates that the display device housing 1200_1 is disposed at the right end of the support frame 1030, but the present disclosure is not limited thereto. For example, the display device housing 1200_1 may be disposed at the left end of the support frame 1030, and in this case, the image of the display device 10_3 may be provided to the user's left eye. Alternatively, the display device housing 1200_1 may be disposed at both the left and right ends of the support frame 1030, and in this case, the user may view the image displayed on the display device 10_3 through both the left and right eyes.

Figure 11:
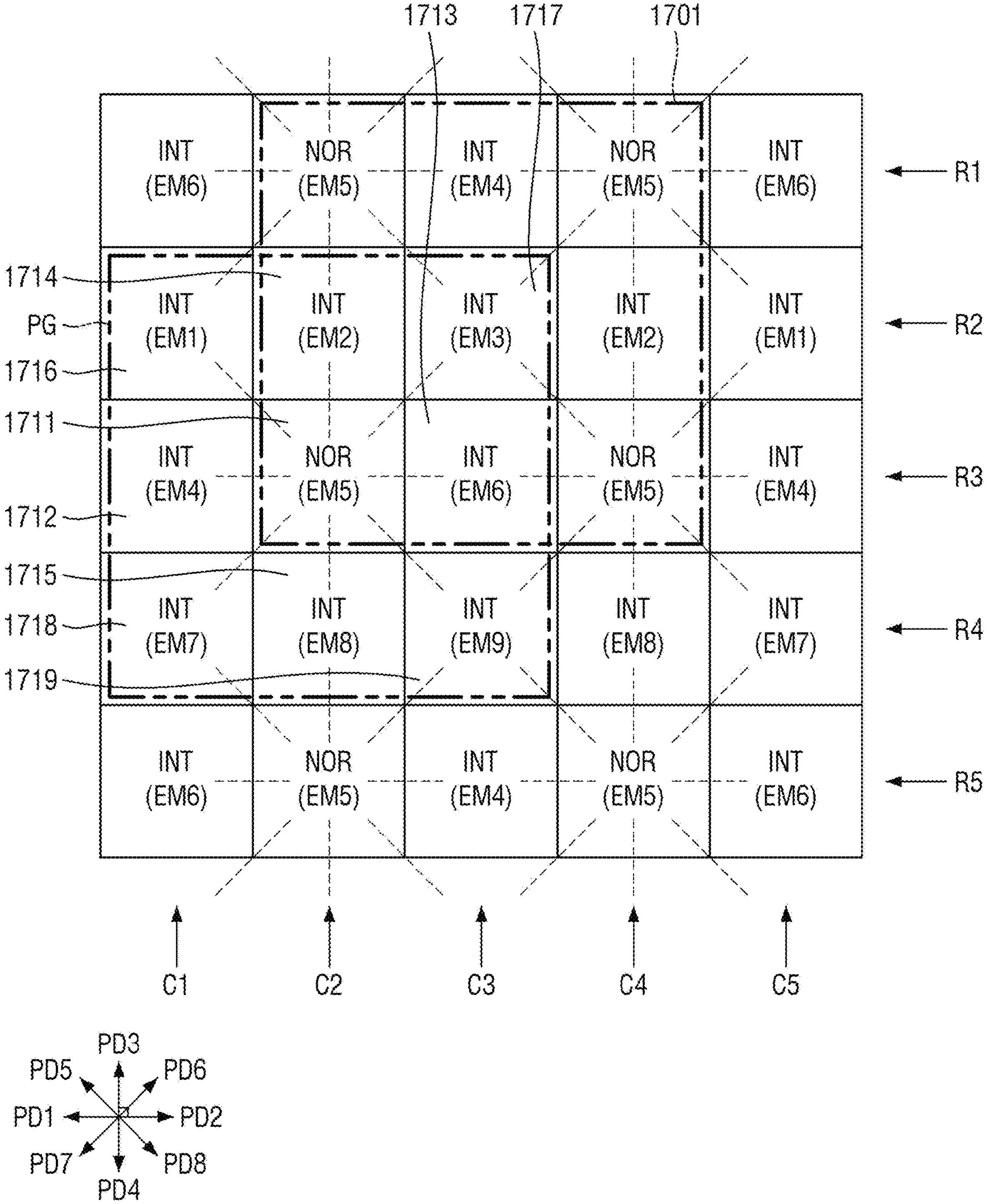
FIG. 11 is a diagram schematically showing the arrangement of pixels of the display panel according to one or more embodiments.

FIG. 11 is a diagram schematically showing the arrangement of pixels of the display panel 100 according to one or more embodiments.

Referring to FIG. 11, in the display panel 100 (e.g., see FIG. 1) according to one or more embodiments, one normal pixel and a plurality of interpolation pixels 1712 to 1719 surrounding one normal pixel 1711 forms one pixel group PG. For example, the one pixel group PG may include total of nine pixels including the one normal pixel 1711.

Figure 15:
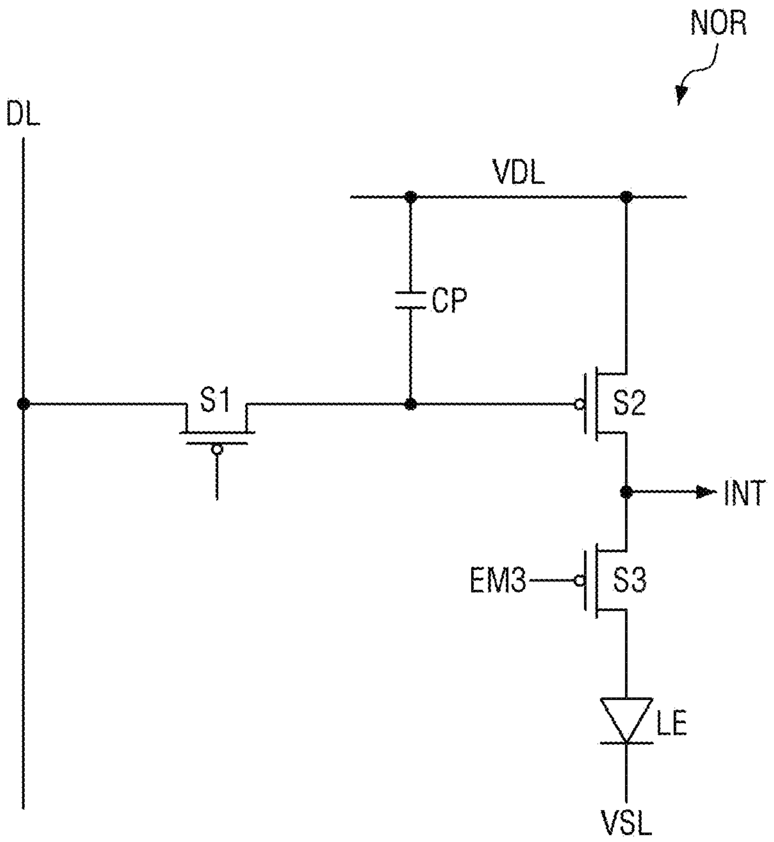
FIG. 15 is an equivalent circuit diagram of a normal pixel according to one or more embodiments.

The normal pixel 1711 of each pixel group PG may be connected to a data line (e.g., DL of FIG. 3), and drive the normal light emitting element LE according to a data voltage provided from the data line (e.g., DL of FIG. 15).

The interpolation pixels 1712 to 1719 of each pixel group PG are disposed to be around (e.g., to surround) the normal pixel 1711 and receive a part of a driving current that is supplied by a normal light emitting transistor (e.g., EM_TR5 of FIG. 13) to the normal light emitting element LE. Each of the interpolation pixels 1712 to 1719 may include an interpolation light emitting transistor (e.g., EM_TR4 of FIG. 13) driving the interpolation light emitting element LE based on the driving current provided from the normal pixel 1711.

Hereinafter, more specifically, the pixel group PG will be described.

According to one or more embodiments, one normal pixel 1711 includes the normal light emitting transistor (e.g., EM_TR5 of FIG. 13) supplying the driving current provided through a first node N1 (e.g., N1 of FIG. 13) that is connected to the drain electrode of a driving transistor DR in response to the driving transistor (e.g., DR of FIG. 13), the normal light emitting element LE, and the normal light emitting signal (e.g., EM5 of FIG. 13) to the normal light emitting element LE. In the present disclosure, the driving transistor DR and the normal light emitting transistor (e.g., EM_TR5 of FIG. 13) is exemplified as being P-type transistors, but the present disclosure in not limited thereto. For example, the driving transistor DR and the normal light emitting transistor (e.g., EM_TR5 of FIG. 13) may be N-type transistors.

The driving transistor may be DR described later with reference to FIG. 13.

The normal light emitting transistor may be EM_TR5 described later with reference to FIG. 13.

The normal light emitting signal for controlling the normal light emitting transistor may be a fifth emission control signal EM5 described later with reference to FIG. 13.

Figure 12:
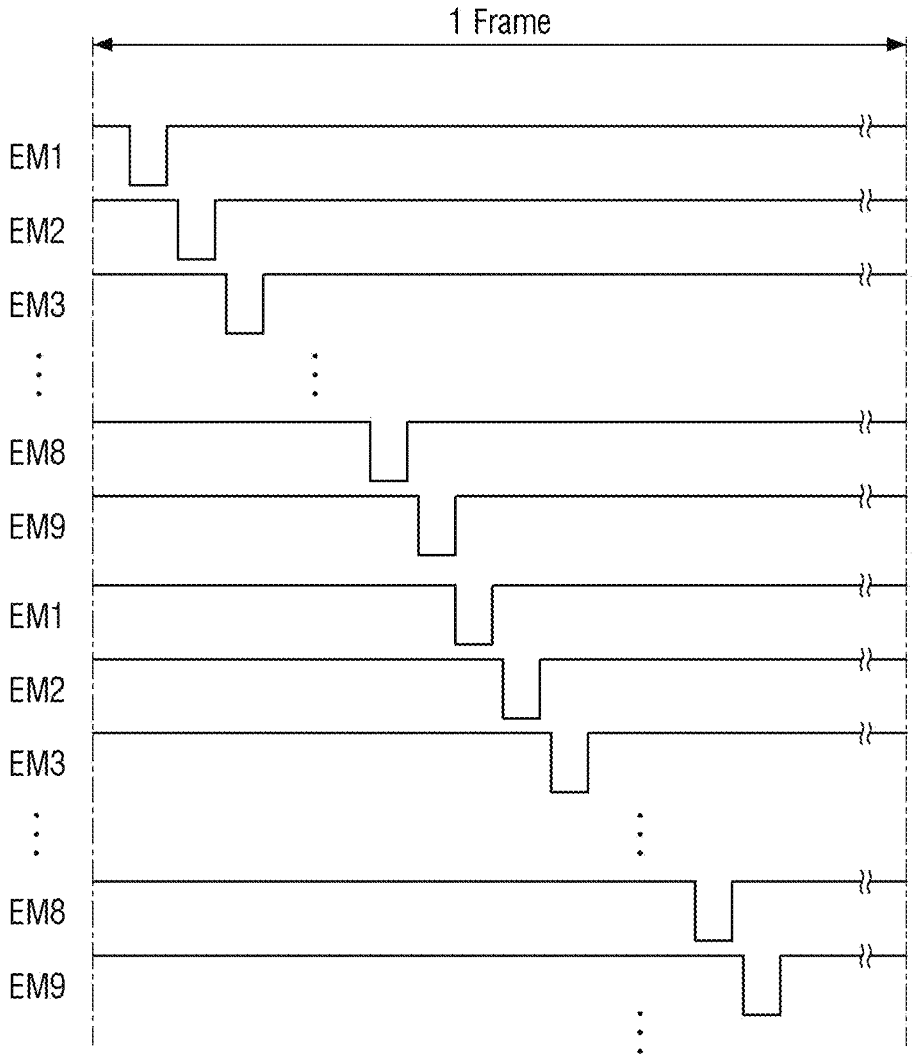
FIG. 12 is a diagram showing the timing of an emission control signal for driving pixels of a display panel according to one or more embodiments.

Each of the interpolation pixels 1712 to 1719 includes a plurality of interpolation light emitting transistors supplying a part of the driving current inputted from the first node N1 of the adjacent normal pixel 1711 to the light emitting element LE in response to the interpolation light emitting element LE and the interpolation light emitting signal (e.g., EM1 to EM4 and EM6 to EM9 of FIG. 12). In the present disclosure, the interpolation light emitting transistor is exemplified as being a P-type transistor, but the present disclosure is not limited thereto. For example, the interpolation light emitting transistor may be an N-type transistor.

Figure 13:
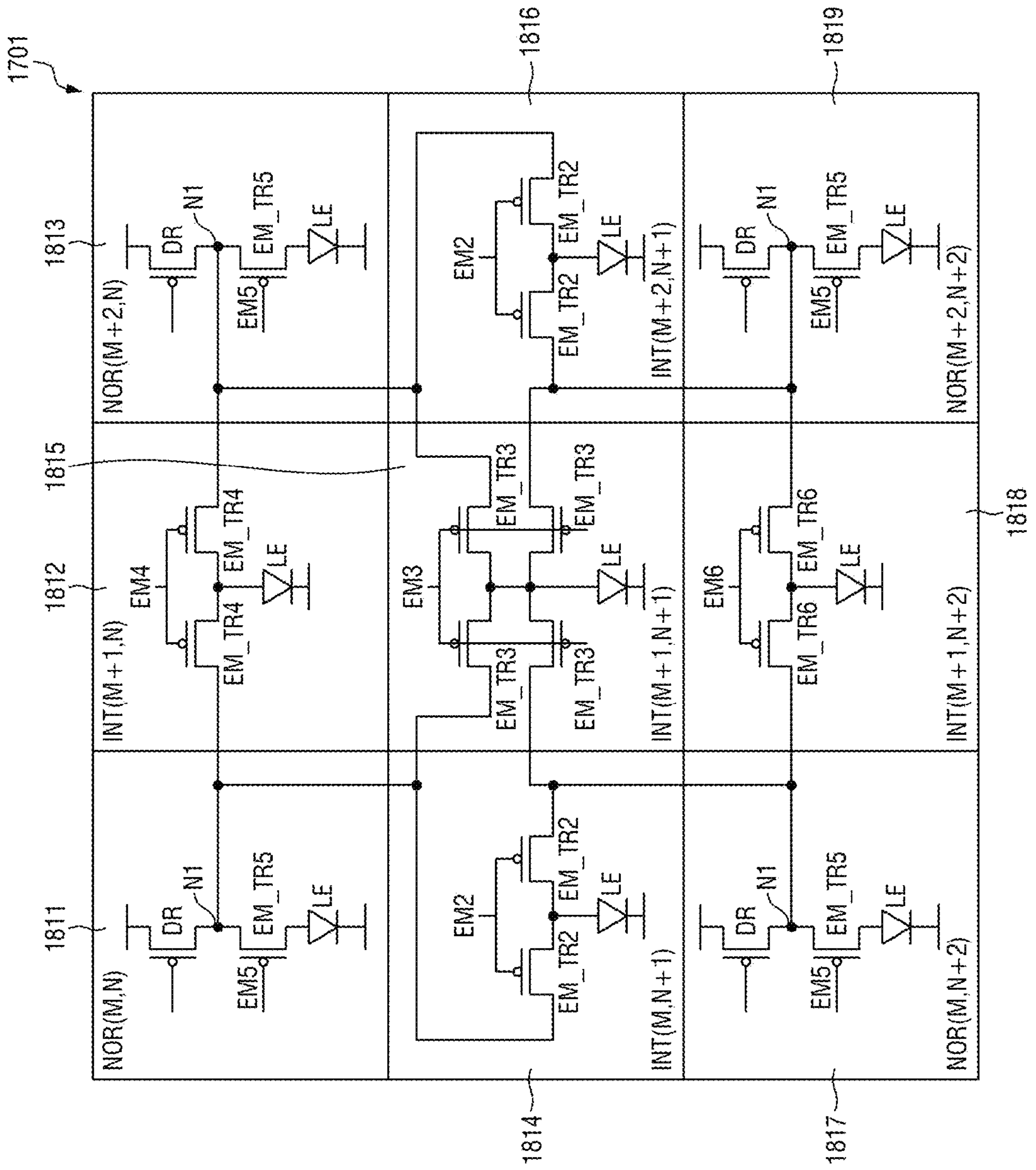
FIG. 13 is a circuit diagram showing the connection relation of a normal pixel and an interpolation pixel according to one or more embodiments.

The interpolation light emitting transistor may be shown as EM_TR2, EM_TR3, EM_TR4, and EM_TR6 with reference to FIG. 13.

The interpolation light emitting signal for controlling the interpolation light emitting transistor may be shown as a second emission control signal EM2, a third emission control signal EM3, a fourth emission control signal EM4, and a sixth emission control signal EM6 with reference to FIG. 13.

According to one or more embodiments, one pixel group PG includes a normal pixel 1711 disposed at the center in the one pixel group PG, a first interpolation pixel 1712 disposed in a first plane direction PD1 from the normal pixel 1711, a second interpolation pixel 1713 disposed in a second plane direction PD2 opposite to the first plane direction PD1 from the normal pixel 1711, a third interpolation pixel 1714 disposed in a third plane direction PD3 perpendicular to the first plane direction PD1 from the normal pixel 1711, a fourth interpolation pixel 1715 disposed in a fourth plane direction PD4 opposite to the third plane direction PD3 from the normal pixel 1711, a fifth interpolation pixel 1716 disposed in a first diagonal direction PD5 between the first plane direction PD1 and the third plane direction PD3 from the normal pixel 1711, a sixth interpolation pixel 1717 disposed in a second diagonal direction PD6 between the second plane direction PD2 and the third plane direction PD3 from the normal pixel 1711, a seventh interpolation pixel 1718 disposed in a third diagonal direction PD7 opposite the second diagonal direction PD6 from the normal pixel 1711, and an eighth interpolation pixel 1719 disposed in a fourth diagonal direction PD8 opposite the first diagonal direction PD5 from the normal pixel 1711.

The interpolation light emitting transistor included in the fifth interpolation pixel 1716 is turned on in response to the first emission control signal EM1. When turned on, the interpolation light emitting transistor of the fifth interpolation pixel 1716 drives the interpolation light emitting element LE provided in the fifth interpolation pixel 1716 based on the driving current inputted from the peripheral normal pixel 1711.

The interpolation light emitting transistor (e.g., EM_TR2 of FIG. 13) included in the third interpolation pixel 1714 is turned on in response to the second emission control signal EM2. When turned on, the interpolation light emitting transistor (e.g., EM_TR2 of FIG. 13) of the third interpolation pixel 1714 drives the interpolation light emitting element LE provided in the third interpolation pixel 1714 based on the driving current inputted from the peripheral normal pixel 1711.

The interpolation light emitting transistor (e.g., EM_TR3 of FIG. 13) included in the sixth interpolation pixel 1717 is turned on in response to the third emission control signal EM3. When turned on, the interpolation light emitting transistor (e.g., EM_TR3 of FIG. 13) of the sixth interpolation pixel 1717 drives the interpolation light emitting element LE provided in the sixth interpolation pixel 1717 based on the driving current inputted from the peripheral normal pixel 1711.

The interpolation light emitting transistor (e.g., EM_TR4 of FIG. 13) included in the first interpolation pixel 1712 is turned on in response to the fourth emission control signal EM4. When turned on, the interpolation light emitting transistor (e.g., EM_TR4 of FIG. 13) of the first interpolation pixel 1712 drives the interpolation light emitting element LE provided in the first interpolation pixel 1712 based on the driving current inputted from the peripheral normal pixel 1711.

The normal light emitting transistor (e.g., EM_TR5 of FIG. 13) included in the normal pixel 1711 is turned on in response to the fifth emission control signal EM5. The normal light emitting transistor (e.g., EM_TR5 of FIG. 13) of the normal pixel 1711 receives the driving current corresponding to the data voltage from the driving transistor DR. When turned on, the normal light emitting transistor (e.g., EM_TR5 of FIG. 13) may drive the normal light emitting element LE based on the driving current inputted from the driving transistor DR. The first node N1 (e.g., drain electrode of the driving transistor DR) positioned between the driving transistor DR and the normal light emitting transistor (e.g., EM_TR5 of FIG. 13) may be connected to the interpolation pixels 1712 to 1719 positioned at the periphery of the normal pixel 1711. Accordingly, a part of the driving current that the driving transistor DR of the normal pixel 1711 outputs may be provided to the interpolation pixels 1712 to 1719 positioned at the periphery of the normal pixel 1711. For example, one normal pixel 1711 may provide a part of the driving current to the eight interpolation pixels 1712 to 1719 (i.e., first to eighth interpolation pixels 1712 to 1719) around (e.g., surrounding) the one normal pixel 1711.

The interpolation light emitting transistor (e.g., EM_TR6 of FIG. 13) included in the second interpolation pixel 1713 is turned on in response to the sixth emission control signal EM6. When turned on, the interpolation light emitting transistor (e.g., EM_TR6 of FIG. 13) of the second interpolation pixel 1713 drives the interpolation light emitting element LE provided in the second interpolation pixel 1713 based on the driving current inputted from the peripheral normal pixel 1711.

The interpolation light emitting transistor included in the seventh interpolation pixel 1718 is turned on in response to the seventh emission control signal EM7. When turned on, the interpolation light emitting transistor of the seventh interpolation pixel 1718 drives the interpolation light emitting element LE provided in the seventh interpolation pixel 1718 based on the driving current inputted from the peripheral normal pixel 1711.

The interpolation light emitting transistor included in the fourth interpolation pixel 1715 is turned on in response to the eighth emission control signal EM8. When turned on, the interpolation light emitting transistor of the fourth interpolation pixel 1715 drives the interpolation light emitting element LE provided in the fourth interpolation pixel 1715 based on the driving current inputted from the peripheral normal pixel 1711.

The interpolation light emitting transistor included in the eighth interpolation pixel 1719 is turned on in response to the ninth emission control signal EM9. When turned on, the interpolation light emitting transistor of the eighth interpolation pixel 1719 drives the interpolation light emitting element LE provided in the eighth interpolation pixel 1719 based on the driving current inputted from the peripheral normal pixel 1711.

FIG. 12 is a diagram showing the timing of an emission control signal for driving pixels of a display panel according to one or more embodiments.

Referring to FIG. 12, the emission control signal according to one or more embodiments includes first to ninth emission control signals EM1 to EM9.

The first to ninth emission control signals EM1 to EM9 are outputted sequentially during one frame period. In addition, an activation period of each of the first to ninth emission control signals EM1 to EM9 does not overlap each other.

After the first to ninth emission control signals EM1 to EM9 are sequentially outputted, the first to ninth emission control signals EM1 to EM9 may be sequentially outputted again. For example, after the ninth emission control signal EM9 is outputted, the first emission control signal EM1 to ninth emission control signal EM9 may be sequentially outputted again.

Referring to FIGS. 11-13, the fifth emission control signal EM5 may be a "normal emission signal" for controlling the normal light emitting transistor of the normal pixel 1711.

Referring to FIGS. 11 and 12, the first to fourth emission control signals EM1 to EM4 and the sixth to ninth emission control signals EM6 to EM9 may each be an "interpolation emission signal" for controlling the interpolation light emitting transistor of the interpolation pixel.

By sequentially outputting the first to ninth emission control signals EM1 to EM9, the display device according to one or more embodiments may time-divide the light emitting time of the normal pixel 1711 and the interpolation pixels 1712 to 1719 within one frame. That is, the light emitting time of each of the normal pixel 1711 and the interpolation pixels 1712 to 1719 does not overlap each other. If the light emitting time of each of the normal pixel 1711 and the interpolation pixels 1712 to 1719 overlap each other, a short circuit in a current path between the normal pixel 1711 and the interpolation pixels 1712 to 1719 may occur, and the image defects may occur.

FIG. 13 is a circuit diagram showing the connection relation of a normal pixel 1711 and interpolation pixels according to one or more embodiments.

FIG. 13 is a circuit diagram of an enlarged area 1701 of FIG. 11.

In FIG. 13, 1811 indicates a normal pixel 1711 disposed in $N^{th}$ row and $M^{th}$ column. In FIG. 13, 1812 indicates a first interpolation pixel 1712 disposed in $N^{th}$ row and $(M+1)^{th}$ column. In FIG. 13, 1813 indicates a normal pixel 1711 disposed in $N^{th}$ row and $(M+2)^{th}$ column. In FIG. 13, 1814 indicates a third interpolation pixel 1714 disposed in $(N+1)^{th}$ row and $M^{th}$ column. In FIG. 13, 1815 indicates a sixth interpolation pixel 1717 disposed in $(N+1)^{th}$ row and $(M+1)^{th}$ column. In FIG. 13, 1816 indicates a third interpolation pixel 1714 disposed in $(N+1)^{th}$ row and $(M+2)^{th}$ column. In FIG. 13, 1817 indicates a normal pixel 1711 disposed in $(N+2)^{th}$ row and $M^{th}$ column. In FIG. 13, 1818 indicates a second interpolation pixel 1713 disposed in $(N+2)^{th}$ row and $(M+1)^{th}$ column. In FIG. 13, 1819 indicates a normal pixel 1711 disposed in $(N+2)^{th}$ row and $(M+2)^{th}$ column. As described above, only the first, second, third, and sixth interpolation pixels 1712, 1713, 1714, and 1717 from among the first to eighth interpolation pixels 1712 to 1719 illustrated in FIG. 11 are illustrated in FIG. 13.

Hereinafter, the connection relationship between the normal pixel 1711 and the interpolation pixels according to one or more embodiments will be specifically described in conjunction with FIGS. 11 and 13.

Referring to FIGS. 11 and 13, the first to eighth interpolation pixels 1712 to 1719 included in one pixel group PG may be divided into two groups as described below.

First, a first group is interpolation pixels 1712 to 1719 positioned in each of the left, right, upper and lower directions of the normal pixel 1711. For example, the first group includes the first to fourth interpolation pixels 1712 to 1715 positioned in each of the first to fourth plane directions PD1 to PD4 from the normal pixel 1711. In addition, a second group is interpolation pixels 1716 to 1719 positioned in four diagonal directions of the normal pixel 1711. For example, the second group includes the fifth to eighth interpolation pixels 1716 to 1719 positioned in each of the first to fourth diagonal directions PD5 to PD8 from the normal pixel 1711.

Each of the first to fourth interpolation pixels 1712 to 1715 corresponding to the first group includes one pair of interpolation light emitting transistor that receives a portion of a first driving current from the first normal pixel 1711 and a portion of a second driving current from the second normal pixel 1711.

A first interpolation pixel 1812 (e.g., 1712 of FIG. 11) includes one pair of interpolation light emitting transistors EM_TR4 that receives a portion of a first driving current from a first normal pixel 1811 disposed in the first plane direction PD1 from the first interpolation pixel 1812 and receives a portion of a second driving current from a second normal pixel 1813 disposed in the second plane direction PD2 from the first interpolation pixel 1812. The one pair of interpolation light emitting transistors EM_TR4 provided in the first interpolation pixel 1812 may be turned on in response to a fourth emission control signal EM4.

A second interpolation pixel 1818 (e.g., 1713 of FIG. 11) includes one pair of interpolation light emitting transistors EM_TR6 that receives a portion of a first driving current from a first normal pixel 1817 disposed in the first plane direction PD1 from the second interpolation pixel 1818 and receives a portion of a second driving current from a second normal pixel 1819 disposed in the second plane direction PD2 from the second interpolation pixel 1818. The one pair of interpolation light emitting transistors EM_TR6 provided in the second interpolation pixel 1818 may be turned on in response to a sixth emission control signal EM6.

Each of the third interpolation pixels 1814 and 1816 (e.g., 1714 of FIG. 11) includes one pair of interpolation light emitting transistors EM_TR2 that receives a portion of a first driving current from the first normal pixels 1811 and 1813 disposed in the third plane direction PD3 from the third interpolation pixels 1814 and 1816 and receives a portion of a second driving current from the second normal pixels 1817 and 1819 disposed in the fourth plane direction PD4 from the third interpolation pixels 1814 and 1816. The one pair of interpolation light emitting transistors EM_TR2 provided in each of the third interpolation pixels 1814 and 1816 may be turned on in response to a second emission control signal EM2.

A fourth interpolation pixel 1715 includes one pair of interpolation light emitting transistors that receives a portion of a first driving current from the first normal pixel 1711 disposed in the third plane direction PD3 from the fourth interpolation pixel 1715 and receives a portion of a second driving current from the second normal pixel 1711 disposed in the fourth plane direction PD4 from the fourth interpolation pixel 1715. The one pair of interpolation light emitting transistors provided in the fourth interpolation pixel 1715 may be turned on in response to an eighth emission control signal EM8.

Each of the fifth to eighth interpolation pixels 1716 to 1719 corresponding to the second group includes two pairs of interpolation light emitting transistors that receive a portion of the first driving current from the first normal pixel 1711, receives a portion of the second driving current from the second normal pixel 1711, receives a portion of a third driving current from the third normal pixel 1711, and receives a portion of a fourth driving current from the fourth normal pixel 1711.

The fifth interpolation pixel 1716 includes two pairs of interpolation light emitting transistors that receive driving currents from the normal pixels 1711 disposed in each of the first to fourth diagonal directions PD5 to PD8. The two pairs of interpolation light emitting transistors provided in the fifth interpolation pixel 1716 may be turned on in response to the first emission control signal EM1.

The sixth interpolation pixel 1815 (e.g., 1717 of FIG. 11) includes two pairs of interpolation light emitting transistors EM_TR3 that receive driving currents from the normal pixels 1811, 1813, 1817, and 1819 disposed in each of the first to fourth diagonal directions PD5 to PD8 from the sixth interpolation pixel 1815. The two pairs of interpolation light emitting transistors EM_TR3 provided in the sixth interpolation pixel 1815 may be turned on in response to the third emission control signal EM3.

The seventh interpolation pixel 1718 includes two pairs of interpolation light emitting transistors that receive driving currents from the normal pixels 1711 disposed in each of the first to fourth diagonal directions PD5 to PD8 from the seventh interpolation pixel 1718. The two pairs of interpolation light emitting transistors provided in the seventh interpolation pixel 1718 may be turned on in response to the seventh emission control signal EM7.

The eighth interpolation pixel 1719 includes two pairs of interpolation light emitting transistors that receive driving currents from the normal pixels 1711 disposed in each of the first to fourth diagonal directions PD5 to PD8 from eighth interpolation pixel 1719. The two pairs of interpolation light emitting transistors provided in the eighth interpolation pixel 1719 may be turned on in response to the ninth emission control signal EM9.

According to one or more embodiments, in the display area DAA of the display panel 100, the normal pixel 1711 and the first to eighth interpolation pixels 1712 to 1719 may be arranged in a matrix form and arranged according to the following rules. Hereinafter, the arrangement of the normal pixel 1711 and the first to eighth interpolation pixels 1712 to 1719 will be described in detail with reference to FIG. 11.

The normal pixels 1711 are arranged at specified intervals in the odd-numbered pixel rows (e.g., R1, R3, and R5), and the first interpolation pixel 1712 and the second interpolation pixel 1713 are alternately arranged between the neighboring normal pixels 1711 in the odd-numbered pixel rows R1, R3, and R5. The normal pixel 1711 is not disposed in the even-numbered pixel rows (e.g., R2 and R4).

The normal pixels 1711 are arranged at specified intervals in the even-numbered pixel columns (e.g., C2 and C4), and the third interpolation pixel 1714 and the fourth interpolation pixel 1715 are alternately arranged between the neighboring normal pixels 1711 in the even-numbered pixel columns C2 and C4. The normal pixel 1711 is not disposed in odd-numbered pixel columns (e.g., C1, C3, and C5).

In any pixel row (e.g., R2) where the third interpolation pixel 1714 is disposed, the fifth interpolation pixel 1716 and the sixth interpolation pixel 1717 are alternately arranged with the third interpolation pixel 1714 interposed therebetween.

In any pixel row (e.g., R4) where the fourth interpolation pixel 1715 is disposed, the seventh interpolation pixel 1718 and the eighth interpolation pixel 1719 are alternately arranged with the fourth interpolation pixel 1715 interposed therebetween.

According to one or more embodiments, the current of each pixel shown in FIG. 13 may organized as Table 1. The current of each pixel described in Table 1 represents the luminance of the corresponding pixel. In one or more embodiments, the driving current (Iout=$I_{DS}$) flowing through the driving transistor DR may be adjusted by setting the on-duty ratio of each light emitting signal differently within one frame. Accordingly, the luminance of each interpolation pixel may be adjusted and the degree of a screen-door effect may be controlled. The screen-door effect may mean a phenomenon in which the boundary between the adjacent pixels is visible to the user.

TABLE 1

| | | |
|---|---|---|
| NOR(M, N)<br>Iout = $I_{data}$(m, n)*EM1 Duty ratio = A | INT(M + 1, N)<br>Iout = (A + B)*EM2 Duty ratio | NOR(M + 2, N)<br>Iout = $I_{data}$(m + 2, n)*EM1 Duty ratio = B |
| INT(M, N + 1)<br>Iout = (A + C)*EM2 Duty ratio | INT(M + 1, N + 1)<br>Iout = (A + B + C + D)*EM2 Duty ratio | INT(M + 2, N + 1)<br>Iout = (B + D)*EM2 Duty ratio = A |
| NOR(M, N + 2)<br>Iout = $I_{data}$(m, n + 2)*EM1 Duty ratio = C | INT(M + 1, N + 2)<br>Iout = (C + D)*EM2 Duty ratio | INT(M + 2, N + 2)<br>Iout = $I_{data}$(m + 2, n + 2)*EM1 Duty ratio = D |

According to one or more embodiments, the display device may selectively perform an upscaling operation. For example, the display device may perform an up-scaling off operation by turning off the "interpolation light emitting signal" that controls the interpolation light emitting transistor of the interpolation pixel.

Figure 14:
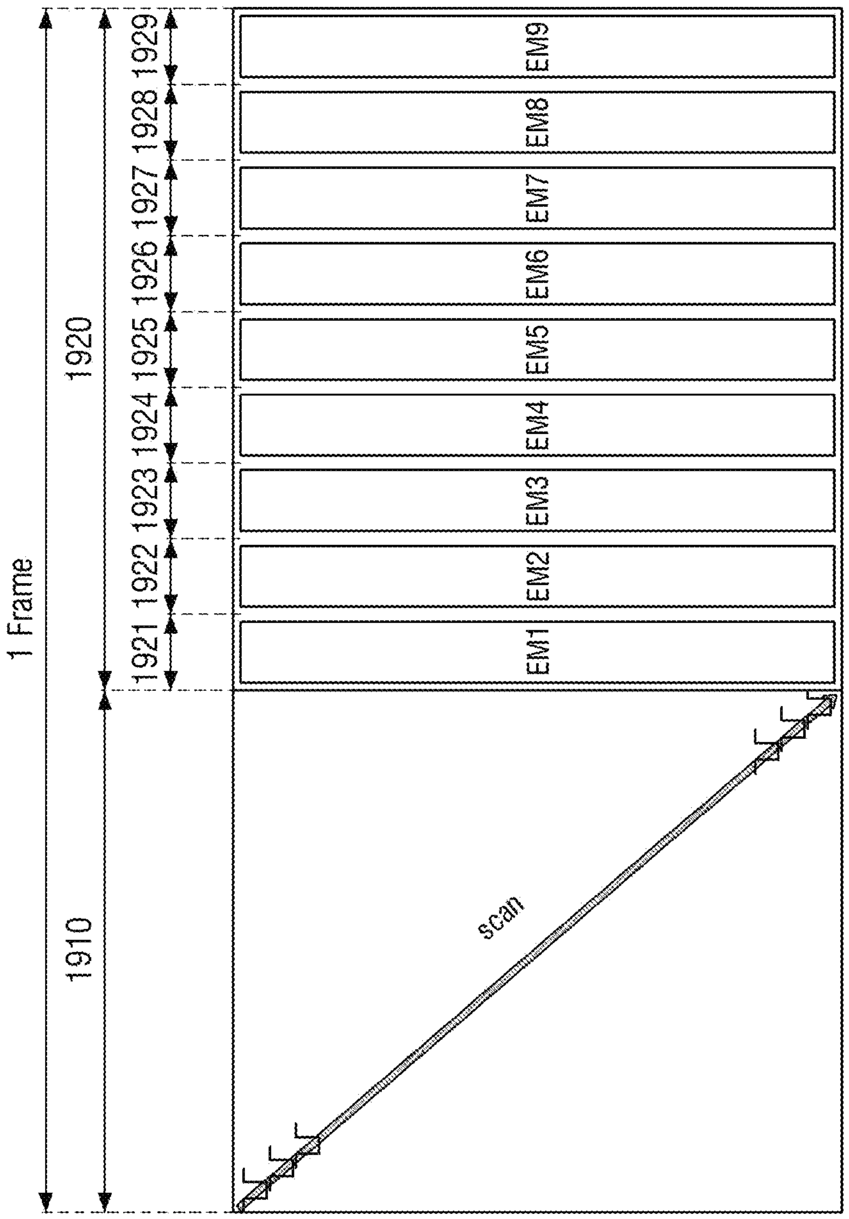
FIG. 14 is a diagram showing the timing of an emission control signal for driving pixels of a display panel according to one or more embodiments.

FIG. 14 is a diagram showing the timing of an emission control signal for driving pixels of a display panel according to one or more embodiments.

The embodiment of FIG. 14 is different from the embodiment of FIG. 12 in that the first to ninth emission control signals EM1 to EM9 are global signals outputted only once per one frame.

Referring to FIG. 14, one frame period may be divided into a scan period 1910 in which a data voltage is sequentially applied to the entire pixels provided in the display panel 100 (e.g., see FIG. 1) and a light emitting period 1920 after the scan period 1910.

The light emitting period 1920 may include a first light emitting period 1921 outputting the first emission control signal EM1, a second light emitting period 1922 outputting the second emission control signal EM2, a third light emitting period 1923 outputting the third emission control signal EM3, a fourth light emitting period 1924 outputting the fourth emission control signal EM4, a fifth light emitting period 1925 outputting the fifth emission control signal EM5, a sixth light emitting period 1926 outputting the sixth emission control signal EM6, a seventh light emitting period 1927 outputting the seventh emission control signal EM7, an eighth light emitting period 1928 outputting the eighth emission control signal EM8, and a ninth light emitting period 1929 outputting the ninth emission control signal EM9.

In the first light emitting period 1921, the first emission control signal EM1 may be output globally, and accordingly, the fifth interpolation pixels 1716 provided in the display panel may emit light concurrently (e.g., simultaneously).

In the second light emitting period 1922, the second emission control signal EM2 may be output globally, and accordingly, the third interpolation pixels 1714 provided in the display panel 100 may emit light concurrently (e.g., simultaneously).

In the third light emitting period 1923, the third emission control signal EM3 may be output globally, and accordingly, the sixth interpolation pixels 1717 provided in the display panel 100 may emit light concurrently (e.g., simultaneously).

In the fourth light emitting period 1924, the fourth emission control signal EM4 may be output globally, and accordingly, the first interpolation pixels 1712 provided in the display panel 100 may emit light concurrently (e.g., simultaneously).

In the fifth light emitting period 1925, the fifth emission control signal EM5 may be output globally, and accordingly, the normal pixels 1711 provided in the display panel 100 may emit light concurrently (e.g., simultaneously).

In the sixth light emitting period 1926, the sixth emission control signal EM6 may be output globally, and accordingly, the second interpolation pixels 1713 provided in the display panel 100 may emit light concurrently (e.g., simultaneously).

In the seventh light emitting period 1927, the seventh emission control signal EM7 may be output globally, and accordingly, the seventh interpolation pixels 1718 provided in the display panel 100 may emit light concurrently (e.g., simultaneously).

In the eighth light emitting period 1928, the eighth emission control signal EM8 may be output globally, and accordingly, the fourth interpolation pixels 1715 provided in the display panel 100 may emit light concurrently (e.g., simultaneously).

In the ninth light emitting period 1929, the ninth emission control signal EM9 may be output globally, and accordingly, the eighth interpolation pixels 1719 provided in the display panel 100 may emit light concurrently (e.g., simultaneously).

FIG. 15 is an equivalent circuit diagram of a normal pixel 1711 according to one or more embodiments. For example, FIG. 15 may be an equivalent circuit diagram of the normal pixel 1711 illustrated in FIGS. 11 and 13.

Referring to FIG. 15, the normal pixel 1711 provides a scan transistor S1 connected to a data line, a driving transistor S2 (e.g., DR of FIG. 13) generating a driving current in response to a data voltage provided from the scan transistor S1, and a normal light emitting transistor S3 (e.g., EM_TR5 of FIG. 13) receiving the driving current from the driving transistor S2 and supplying the driving current according to the light emitting element LE according to a normal light emitting signal (e.g., fifth emission control signal EM5). In addition, the normal pixel 1711 may further provide a capacitor CP connected between a gate electrode of the driving transistor DR and a second driving voltage line VDL to which a second driving voltage (VDD of FIG. 2) corresponding to a high potential voltage is applied. A node between the driving transistor S2 and the normal light emitting transistor S3 may be defined as a first node (e.g., N1 of FIG. 13), and the first node N1 may be connected to an interpolation pixel INT at the periphery of normal pixel 1711.

In concluding the detailed description, those skilled in the art will appreciate that many variations and modifications can be made to the embodiments of the present disclosure without substantially departing from the principles of the present disclosure. Therefore, the embodiments of the present disclosure are used in a generic and descriptive sense only and not for purposes of limitation.

What is claimed is:

1. A display device comprising:

a display panel comprising a plurality of pixel groups, wherein one pixel group from among the plurality of pixel groups comprises a normal pixel and a plurality of interpolation pixels around the normal pixel, wherein the normal pixel comprises a driving transistor, a normal light emitting element, and a normal light emitting transistor configured to supply a driving current provided through a first node connected to a drain electrode of the driving transistor in response to a normal light emitting signal to the normal light emitting element, wherein each of the plurality of interpolation pixels comprises an interpolation light emitting element and a plurality of interpolation light emitting transistors configured to supply a part of the driving current inputted from the first node of an adjacent normal pixel in response to an interpolation light emitting signal to the interpolation light emitting element, and wherein:

the normal pixel is at a center in the one pixel group;

a first interpolation pixel from among the plurality of interpolation pixels is in a first plane direction from the normal pixel;

a second interpolation pixel from among the plurality of interpolation pixels is in a second plane direction opposite to the first plane direction from the normal pixel;

a third interpolation pixel from among the plurality of interpolation pixels is in a third plane direction perpendicular to the first plane direction from the normal pixel;

a fourth interpolation pixel from among the plurality of interpolation pixels is in a fourth plane direction opposite to the third plane direction from the normal pixel;

a fifth interpolation pixel from among the plurality of interpolation pixels is in a first diagonal direction between the first plane direction and the third plane direction from the normal pixel;

a sixth interpolation pixel from among the plurality of interpolation pixels is in a second diagonal direction between the second plane direction and the third plane direction from the normal pixel;

a seventh interpolation pixel from among the plurality of interpolation pixels is in a third diagonal direction opposite to the second diagonal direction from the normal pixel; and an eighth interpolation pixel from among the plurality of interpolation pixels is in a fourth diagonal direction opposite to the first diagonal direction from the normal pixel.

2. The display device of claim 1, wherein each of the first to fourth interpolation pixels comprises one pair of interpolation light emitting transistors configured to receive a portion of a first driving current from a first normal pixel and configured to receive a portion of a second driving current from a second normal pixel.

3. The display device of claim 1, wherein the first interpolation pixel comprises one pair of interpolation light emitting transistors configured to receive a portion of a first driving current from a first normal pixel in the first plane direction from the first interpolation pixel and configured to receive a portion of a second driving current from a second normal pixel in the second plane direction from the first interpolation pixel, and wherein the second interpolation pixel comprises one pair of interpolation light emitting transistors configured to receive a portion of a first driving current from a first normal pixel in the first plane direction from the second interpolation pixel and configured to receive a portion of a second driving current from a second normal pixel in the second plane direction from the second interpolation pixel.

4. The display device of claim 1, wherein the third interpolation pixel comprises one pair of interpolation light emitting transistors configured to receive a portion of a first driving current from a first normal pixel in the third plane direction from the third interpolation pixel and configured to receive a portion of a second driving current from a second normal pixel in the fourth plane direction from the third interpolation pixel, and wherein the fourth interpolation pixel comprises one pair of interpolation light emitting transistors configured to receive a portion of a first driving current from a first normal pixel in the third plane direction from the fourth interpolation pixel and configured to receive a portion of a second driving current from a second normal pixel in the fourth plane direction from the fourth interpolation pixel.

5. The display device of claim 1, wherein each of the fifth to eighth interpolation pixels comprises two pairs of interpolation light emitting transistors configured to receive a portion of a first driving current from a first normal pixel, configured to receive a portion of a second driving current from a second normal pixel, configured to receive a portion of a third driving current from a third normal pixel, and configured to receive a portion of a fourth driving current from a fourth normal pixel.

6. The display device of claim 5,
wherein the fifth interpolation pixel comprises two pairs of interpolation light emitting transistors configured to receive driving currents from the normal pixels in each of the first to fourth diagonal directions from the fifth interpolation pixel,
wherein the sixth interpolation pixel comprises two pairs of interpolation light emitting transistors configured to receive driving currents from the normal pixels in each of the first to fourth diagonal directions from the sixth interpolation pixel,
wherein the seventh interpolation pixel comprises two pairs of interpolation light emitting transistors configured to receive driving currents from the normal pixels in each of the first to fourth diagonal directions from the seventh interpolation pixel, and
wherein the eighth interpolation pixel comprises two pairs of interpolation light emitting transistors configured to receive driving currents from the normal pixels in each of the first to fourth diagonal directions from the eighth interpolation pixel.

7. The display device of claim 6,
wherein an interpolation light emitting transistor in the fifth interpolation pixel is turned on in response to a first emission control signal,
an interpolation light emitting transistor in the third interpolation pixel is turned on in response to a second emission control signal,
an interpolation light emitting transistor in the sixth interpolation pixel is turned on in response to a third emission control signal,
an interpolation light emitting transistor in the first interpolation pixel is turned on in response to a fourth emission control signal,
a normal light emitting transistor in the normal pixel is turned on in response to a fifth emission control signal,
an interpolation light emitting transistor in the second interpolation pixel is turned on in response to a sixth emission control signal,
an interpolation light emitting transistor in the seventh interpolation pixel is turned on in response to a seventh emission control signal,
an interpolation light emitting transistor in the fourth interpolation pixel is turned on in response to an eighth emission control signal, and
an interpolation light emitting transistor in the eighth interpolation pixel is turned on in response to a ninth emission control signal.

8. The display device of claim 7,
wherein the fifth emission control signal supplied to the normal pixel is the normal light emitting signal, and
wherein the first to fourth emission control signals and the sixth to ninth emission control signals supplied to the first to eighth interpolation pixels are interpolation light emitting signals.

9. The display device of claim 8, wherein the first to ninth emission control signals are sequentially outputted during one frame period.

10. The display device of claim 9, wherein an activation period of each of the first to ninth emission control signals does not overlap with each other.

11. The display device of claim 8,
wherein, in a display area of the display panel, the normal pixel and the first to eighth interpolation pixels are arranged in a matrix form,
wherein the normal pixels are at specified intervals in odd-numbered pixel rows, and
wherein the first interpolation pixel and the second interpolation pixel are alternately located between neighboring normal pixels in the odd-numbered pixel rows.

12. The display device of claim 11,
wherein the normal pixels are located at specified intervals in even-numbered pixel columns, and
wherein the third interpolation pixel and the fourth interpolation pixel are alternately located between the neighboring normal pixels in the even-numbered pixel columns.

13. The display device of claim 12, wherein, in any pixel rows in which the third interpolation pixel is located, the fifth interpolation pixel and the sixth interpolation pixel are alternately located with the third interpolation pixel therebetween.

14. The display device of claim 12, wherein, in any pixel rows in which the fourth interpolation pixel is located, the seventh interpolation pixel and the eighth interpolation pixel are alternately located with the fourth interpolation pixel therebetween.

15. A mobile electronic device comprising:
a display panel comprising a plurality of pixel groups, wherein one pixel group from among the plurality of pixel groups comprises a normal pixel and a plurality of interpolation pixels around the normal pixel,
wherein the normal pixel comprises a driving transistor, a normal light emitting element, and a normal light emitting transistor configured to supply a driving current through a first node connected to a drain electrode of the driving transistor in response to a normal light emitting signal to the normal light emitting element,
wherein each of the plurality of interpolation pixels comprises an interpolation light emitting element and a plurality of interpolation light emitting transistors configured to supply a part of the driving current inputted from the first node of an adjacent normal pixel in response to an interpolation light emitting signal to the interpolation light emitting element, and
wherein:
the normal pixel is at a center in the one pixel group;
a first interpolation pixel from among the plurality of interpolation pixels is in a first plane direction from the normal pixel;
a second interpolation pixel from among the plurality of interpolation pixels is in a second plane direction opposite to the first plane direction from the normal pixel;
a third interpolation pixel from among the plurality of interpolation pixels is in a third plane direction perpendicular to the first plane direction from the normal pixel;
a fourth interpolation pixel from among the plurality of interpolation pixels is in a fourth plane direction opposite to the third plane direction from the normal pixel;

a fifth interpolation pixel from among the plurality of interpolation pixels is in a first diagonal direction between the first plane direction and the third plane direction from the normal pixel;

a sixth interpolation pixel from among the plurality of interpolation pixels is in a second diagonal direction between the second plane direction and the third plane direction from the normal pixel;

a seventh interpolation pixel from among the plurality of interpolation pixels is in a third diagonal direction opposite to the second diagonal direction from the normal pixel; and an eighth interpolation pixel from among the plurality of interpolation pixels is in a fourth diagonal direction opposite to the first diagonal direction from the normal pixel.

16. The mobile electronic device of claim 15, wherein each of the first to fourth interpolation pixels comprises one pair of interpolation light emitting transistors configured to receive a portion of a first driving current from a first normal pixel and configured to receive a portion of a second driving current from a second normal pixel.

17. The mobile electronic device of claim 15, wherein the first interpolation pixel comprises one pair of interpolation light emitting transistors configured to receive a portion of a first driving current from a first normal pixel in the first plane direction from the first interpolation pixel and configured to receive a portion of a second driving current from a second normal pixel in the second plane direction from the first interpolation pixel, and wherein the second interpolation pixel comprises one pair of interpolation light emitting transistors configured to receive a portion of a first driving current from a first normal pixel in the first plane direction from the second interpolation pixel and configured to receive a portion of a second driving current from a second normal pixel in the second plane direction from the second interpolation pixel.

18. The mobile electronic device of claim 15, wherein the third interpolation pixel comprises one pair of interpolation light emitting transistors configured to receive a portion of a first driving current from a first normal pixel in the third plane direction from the third interpolation pixel and configured to receive a portion of a second driving current from a second normal pixel in the fourth plane direction from the third interpolation pixel, and wherein the fourth interpolation pixel comprises one pair of interpolation light emitting transistors configured to receive a portion of a first driving current from a first normal pixel in the third plane direction from the fourth interpolation pixel and configured to receive a portion of a second driving current from a second normal pixel in the fourth plane direction from the fourth interpolation pixel.

* * * * *